(12) United States Patent
Fujisato

(10) Patent No.: US 7,578,808 B2
(45) Date of Patent: Aug. 25, 2009

(54) SUCTION-CLEANSING DEVICE AND CLEANSING APPARATUS HAVING THE SAME

(75) Inventor: Ryosaku Fujisato, Ube (JP)

(73) Assignees: Masahiro Watanabe, Yamaguchi-Ken (JP); Tetsuhiko Fujisato, Yamaguchi-ken (JP)

( * ) Notice: Subject to any disclaimer, the term of this patent is extended or adjusted under 35 U.S.C. 154(b) by 799 days.

(21) Appl. No.: 10/771,444

(22) Filed: Feb. 5, 2004

(65) Prior Publication Data

US 2005/0172446 A1 Aug. 11, 2005

(51) Int. Cl.
*A61M 35/00* (2006.01)

(52) U.S. Cl. .................... 604/289; 604/294; 604/295; 604/296; 604/19; 604/315; 239/7; 239/8; 15/302

(58) Field of Classification Search .............. 604/289, 604/294–296, 19, 315; 239/7–8; 15/302; 289/7, 8
See application file for complete search history.

(56) References Cited

U.S. PATENT DOCUMENTS

| | | | |
|---|---|---|---|
| RE28,405 E * | 5/1975 | Sollerud ..................... 4/1 |
| 4,135,670 A * | 1/1979 | Sugimoto ............. 239/428.5 |
| 5,230,106 A * | 7/1993 | Henkin et al. ............ 4/541.4 |
| 6,267,305 B1 * | 7/2001 | Kondo ................... 239/428.5 |
| 6,485,452 B1 * | 11/2002 | French et al. ............... 604/39 |
| 6,706,006 B2 * | 3/2004 | Kostrov et al. ............... 601/9 |
| 6,962,298 B1 * | 11/2005 | Martin ..................... 239/447 |
| 7,059,591 B2 * | 6/2006 | Bortkevitch et al. ......... 261/76 |
| 2007/0194153 A1 * | 8/2007 | Frazee .................. 239/587.1 |

FOREIGN PATENT DOCUMENTS

| FR | 2643574 A1 * | 8/1990 |
|---|---|---|
| JP | 61-103443 S | 5/1986 |
| JP | 63-74123 S | 5/1988 |
| JP | 63-74123 U | 5/1988 |
| JP | 8-196596 A | 8/1996 |
| JP | 08-196596 H | 8/1996 |

* cited by examiner

*Primary Examiner*—Tatyana Zalukaeva
*Assistant Examiner*—Ginger T Chapman
(74) *Attorney, Agent, or Firm*—Sughrue Mion, PLLC

(57) ABSTRACT

The invention provides a suction-cleansing device that is capable of forming a swirling stream at a position close to skin and has both a cleansing and a massaging effect by adequately maintaining a state of minute air bubbles in the stream of water, comprising a vessel body having a hollow portion converging from the rear part side thereof toward the front part side thereof, an air/liquid jetting port secured at the front end portion of the vessel body, a liquid-introducing pipe 4 connected to the circumferential wall at the rear part side of the vessel body in the tangential direction, and an air/liquid jet-guiding portion that is disposed at the outer circumferential portion of the air/liquid jetting port and is widened to open from the air/liquid jetting port toward the jetting direction.

16 Claims, 9 Drawing Sheets

(a)

(b)

(a)

(b)

(a)

(b)

(a)

(b)

ated, it is not possible to generate minute and uniform air bubbles in streams of water, wherein there arises
SUCTION-CLEANSING DEVICE AND CLEANSING APPARATUS HAVING THE SAME

BACKGROUND OF THE INVENTION

1. Field of the Invention

The present invention relates to a suction-cleansing device that carries out cleansing and/or washing by jetting water streams onto a human body or pet animal, and in particular the invention relates to a suction-cleansing device and cleansing apparatus having the same, which are able to massage face skin or other body skin by locally absorbing or rubbing the face skin or other body skin with streams of water.

2. Description of the Prior Art

Recently, a suction-cleansing device has been studied and developed, by which a stream of water discharged from a nozzle port, etc., is jetted onto a human body or pet animal, and cleansing and massaging thereof are carried out.

For example, in Japanese Unexamined Patent Publication No. Hei-8-196596 (hereinafter called Publication "a"), a massage and suction-cleansing device is disclosed, in which a water stream swirling chamber including a pressurized fluid introducing port, disposed at the closed side at one end in the tangential direction of the inner circumference, into which a pressurized fluid is supplied via a water feeding port; an air inlet port disposed at the rear end of the center position; and a water stream discharge port secured at the open side at the other end, is installed inside an outer tube having the water feeding port provided, a central boss which is made open and is faced to the above-described water stream discharge port is provided, a suction port which is made open outwardly is installed at the other end side of the central boss, an air/liquid separation plate is provided at an opening of the central boss faced to the above-described water stream discharge port, and a front swirling chamber is formed between the outer tube and the central boss.

Also, in Japanese Unexamined Utility Model Publication No. Sho-63-74123 (hereinafter called Publication "b"), a suction and massage bubble jet-streaming device is disclosed, in which a liquid feeding port is provided in the tangential direction along the circumferential wall of a mixing chamber, and a discharge port of an air pipe disposed to protrude from the rear part of the mixing chamber toward the front part thereof is positioned at the jetting port of the mixing chamber, a plurality of projections are provided around the jetting port.

However, the above-described prior arts have the following problems and shortcomings.

(1) Since, in the art described in Publication "a," the central boss having an air/liquid separation plate provided is disposed to face the water stream discharge port of the swirling chamber and a percolation plate is provided in the front swirling chamber formed between the central boss and the outer tube, it is not possible to cause the suction force resulting from the swirling stream to effectively maximize performance due to the air/liquid separation plate and percolation plate becoming obstacles. Therefore, since the suction force of the swirling chamber becomes insufficient, the massage effect is made lower in the vicinity of the suction port close to the skin, wherein there arises a problem in that it is difficult to absorb and remove dirt and stains such as oily substances accumulated in skin pores, etc.

(2) Since air suctioned through the air inlet port is disturbed as a result of colliding with the air/liquid separation plate and percolation plate, it is difficult to generate minute and uniform air bubbles in streams of water, wherein there arises another problem in that a cleansing effect of removing dirt and stains by operating minute air bubbles in the streams of water onto stained portions and a massage effect brought about by stimulating the skin with minute air bubbles being as a result of colliding therewith are not made sufficient.

(3) Since the above-described art is not provided with a mechanism for regulating and controlling the amount, size and form, etc., of air bubbles in discharging streams of water, there arises still another problem in that streams of water including minute air bubbles which are excellent in the cleansing effect and massaging effect in response to a use condition cannot be obtained.

(4) Since the air/liquid separation plate, percolation plate, and central boss, etc., are internally incorporated, the structure becomes complicated, wherein the massage and suction-cleansing device of the above-described art is inferior in maintenance and productivity thereof.

(5) Since, in the art described in Publication "b," the air discharge port of the air pipe is disposed very close to the jetting port of the mixing chamber, streams of water inside the mixing chamber in a swirling state are not directly made to contact with air, wherein, since it is impossible to generate minute air bubbles of a prescribed size and form by effectively bringing the swirling streams of water into contact with air while maintaining a prescribed contact area therebetween, a problem arises in that the massaging effect and cleansing effect are not sufficient.

(6) Since a space is formed between the jetting port and skin by projections secured at the circumference of the jetting port although the pressure of the central portion of the mixing chamber is made lower due to the swirling liquid, the swirling streams are disturbed in the vicinity of the skin, and the pressure-reduced portion proves extremely difficult to form. Another problem occurs in that, in the vicinity of the jetting port close to the skin, the suction force is weak, and it is difficult to absorb and remove stains such as oily substances accumulated in skin pores.

(7) Since there is no means for controlling the size and amount of minute air bubbles formed in the streams of water, air which is more than the necessary amount is suctioped through the air pipe, and large air bubbles are formed. Therefore, still another problem arises in that an insufficient massaging effect and cleansing effect can be brought about.

(8) Since a space is formed between a human body and the jetting port due to projections secured at the circumference of the jetting port, there arises a problem in that since the suction force is made insufficient, a sufficient massaging effect cannot be provided since the skin of a human body is not sufficiently absorbed.

(9) Since no guiding portion for adequately regulating the discharging state of jetting water streams is provided, there is a shortcoming in that it is difficult to effectively cause streams of water including minute air bubbles to act on the skin.

The present invention can solve the above-described problems and shortcomings of the above-described prior arts. It is therefore an object of the invention to provide a suction-cleansing device that is capable of forming a swirling stream near skin and applying an intensive suction force thereto and can bring about an excellent cleansing effect and massaging effect by adequately maintaining a state of streams of water including minute air bubbles in the streams of water, and simultaneously to provide a cleansing apparatus of simple construction, which is excellent in productivity and maintenance efficiency.

SUMMARY OF THE INVENTION

In order to solve the above-described problems, a suction-cleansing device and cleansing apparatus having the same according to the invention are provided with the following construction.

A suction-cleansing device according to the first aspect of the invention is constructed by comprising: a. a vessel body having a hollow portion whose profile converges from its rear part side to its front part side; b. an air/liquid jetting port secured at the front end portion of the vessel body; c. a liquid-introducing pipe connected to the circumferential wall of the rear part side of the vessel body in the tangential direction; and d. an air/liquid jet-guiding portion that is disposed at the outer circumferential portion of the air/liquid jetting port and is widened to open from the air/liquid jetting port toward the jetting direction.

With such a construction, the following actions and effects can be brought about.

(1) It is possible to connect a liquid-introducing pipe of a suction-cleansing device to the water-supply port of waterworks and the discharge port side of a pump, etc., and to cause a liquid to flow from the liquid-introducing pipe into the hollow portion of a vessel body in the tangential direction of the circumferential wall thereof. The liquid flown into the hollow portion can be moved into the air/liquid jetting port while swirling along the circumferential wall face that is converged toward the front part side of the hollow portion, and can be jetted through the air/liquid jetting port. A liquid stream (stream of water) is made to collide with skin disposed on the entire surface of the air/liquid jet-guiding portion while swirling along the inner circumferential face of the air/liquid jet-guiding portion connected to the air/liquid jetting port, and at the same time, the pressure of the center portion of the swirling stream is lowered by such a swirling action of the stream of water, wherein cleansing and massaging of the skin, etc., can be carried out.

(2) By bringing the edge portion of the air/liquid jet-guiding portion into contact with skin to be cleansed and massaged, the skin is absorbed by the front of the air/liquid jet-guiding portion whose pressure is reduced by the swirling stream, and a massage effect can be brought about In addition, in a case where air is mixed in advance in a liquid to be supplied into the liquid-introducing port, an air axis consisting of mixed air is formed in the hollow portion at the center portion of the vessel body, and the tip end and surrounding portions of the air axis are made into minute air bubbles in the stream of water by a shearing force produced by a suction force of the stream of water and are diffused therein. Therefore, the minute air bubbles are flown out from the space between the skin and the edge portion of the air/liquid jet-guiding portion along with the stream of water flowing on the skin, whereby cleansing of the skin can be further effectively carried out.

(3) Since, by the air/liquid jet-guiding portion, it is possible to sustain a swirling stream of the air/liquid mixed fluid up to the edge portion of the air/liquid jet-guiding portion, at which the stream of water is made to contact with the skin, it is possible to effectively absorb a large area of skin with a pressure-reduced portion produced by the swirling stream, wherein a high massaging effect can be brought about.

(4) Since the suction-cleansing device does not internally include anything that disturbs the stream of water, it is possible to very effectively generate minute air bubbles of a desired size.

(5) Since the suction-cleansing device is composed of a simple structure which consists of a small number of components, productivity thereof is excellent, and maintenance efficiency is also excellent.

(6) In a case where the suction-cleansing device is used with the air/liquid jet-guiding portion separated from the skin surface, the suction-cleansing device can be effectively used as a shower without any restriction in the diffusion of the streams of water jetted by the air/liquid jet-guiding portion.

Herein, the form of the vessel body may be cannonball-like, circular-truncated, half-spherical, or shaped so as to have a swelled part at the rear wall (for example, spherical). In a case where the vessel body shaped so as to have a swelled part at its rear wall is used, a portion of a liquid flown from the liquid-introducing pipe into the vessel body is moved to the rear wall side and is reversed, and is further moved to the air/liquid jetting port side while swirling around the periphery of the air axis. Therefore, the part of the liquid can be made into a rectilinear jetting stream. Also, contrary to a case where the rear wall is swelled outward, the rear wall may be formed to be concave into the hollow portion, whereby movement of the stream of water may be varied in the hollow portion.

The form of the air/liquid jet-guiding portion may be circular-truncated, half-spherical, or disk-shaped, whereby the jetting state of the air/liquid mixed fluid can be stabilized, and at the same time, the jetting air/liquid mixed fluid can be effectively applied to the skin.

The air/liquid jetting port is an aperture portion which the vessel body converged from the rear part side toward the front part side is narrowed, and may vary in line with the size of the vessel body, amount and pressure of a liquid supplied to the vessel body. However, it is preferable that the diameter d is formed to be $1/15$ through $1/3$ times the maximum inner diameter D of the vessel body, preferably $1/10$ through $1/5$ times. Such a tendency may appear, by which it becomes difficult to secure the discharge amount of a liquid necessary to effectively cleanse and massage the skin surface as the diameter d of the air/liquid jetting port becomes smaller than $1/10$ times the maximum inner diameter D of the vessel body. To the contrary, as the diameter d becomes larger than $1/5$ times the diameter D, it is not possible to form a swirling stream of the liquid in the vessel body, wherein such a tendency may appear, by which the suction force becomes insufficient. These tendencies may become further remarkable if the diameter d becomes smaller than $1/15$ times or larger than $1/3$ times. These are not preferable.

The liquid-introducing pipe is attached to the circumferential wall of the vessel body whose discharge portion is formed roughly cylindrical, in the tangential direction with respect to the circumferential wall face. Therefore, by causing pressurized water to flow into the liquid-introducing pipe with a water-supply port of a pump and waterworks connected thereto, a swirling stream can be generated in the vessel body.

In addition, the velocity of a liquid to be flown into the vessel body, diameter of the liquid-introducing pipe, capacity of the vessel body, and diameter of the air self-suction port may be selected on the basis of a necessary suction force, velocity of the swirling stream, amount of minute air bubbles generated in the stream of water, and pattern of grain sizes thereof.

The suction-cleansing device according to the second aspect of the invention is constructed, in addition to the first aspect, so as to include an air self-suction port that is opened and formed at a position deviated from the axial center of the vessel body or from the air axis formed in the vessel body on the rear wall of the vessel body.

With the construction, the following actions and effects can be brought about in addition to those of the first aspect.

(1) The air axis formed at the center portion of the vessel body causes minute air bubbles to be generated by a shearing force of the streams of water at the tip end and surrounding portion of the rod-like air axis, and flows out from the space between the skin and the edge portion of air/liquid jet-guiding portion along with the streams of water flowing on the skin, and the skin is effectively cleansed.

(2) Since minute air bubbles are mixed in swirling streams which are made to collide with the skin, and the minute air bubbles are adhered to the skin and burst thereon, the skin is stimulated and activated, and at the same time it becomes possible to obtain a high massaging effect.

(3) Since air can be directly suctioned from the air self-suction port into the hollow portion, the suction-cleansing device can be easily used by being connected to a water-supply port of waterworks without using any pump, etc.

(4) By causing minute air bubbles to be mixed in streams of water, it is possible to cause minute air bubbles to reach close to hair roots, wherein the minute air bubbles can be made to impact-like contact with skin, and oxidized sebaceous matter and old cuticles on the skin can be cleansed by the friction action and action brought about when minute air bubbles burst.

(5) A pressure-reduced portion is formed at the center portion of a swirling stream, that is, at the axial center of the vessel body due to swirling motions of the streams of water in the vessel body, and air is suctioned from the air self-suction port toward the pressure-reduced portion, wherein an air axis extending like a rod is formed toward the center of the air/liquid jetting port in the vessel body. At this time, when the air self-suction port is disposed at a position deviated from the axial center of the vessel body, the tip end of the air axis is caused to vibrate, and minute air bubbles can be further effectively generated. The form and size of the air axis can be finely varied by adjustment of the amount of deviation whereby it is possible to obtain streams of water including prescribed minute air bubbles by which the cleansing effect and massaging effect are optimized.

The velocity of a liquid flowing into the vessel body, diameter of the liquid-introducing pipe, capacity of the vessel body, and diameter of the air self-suction port, etc., may be adequately selected in accordance with the suction force by streams of water, the amount of minute air bubbles and pattern of grain size thereof. That is, if the opening diameter of the air self-suction port is increased, the suction amount of air through the air self-suction port is accordingly increased, wherein the suction force acting on the skin is decreased. If the opening diameter of the air self-suction port is decreased, the suction amount of air through the air self-suction port is accordingly decreased, wherein the suction force acting on the skin is increased.

Although the diameter of the air self-suction port is varied on the basis of the pressure and flow quantity of water supplied through the liquid-introducing pipe, size and form of the vessel body, etc., it is highly recommended that the port diameter is made 0.01 through 0.5 mm, preferably still 0.03 through 0.1 mm. This is because, if the diameter of the air self-suction port is made smaller than 0.03 mm, such a tendency occurs, by which the amount of air supplied into the vessel body is made short, and to the contrary, if the port diameter is made larger than 0.1 mm, such a tendency occurs, by which the diameter of air bubbles diffused in streams of water is gradually increased, and the cleansing effect and massaging effect brought about by minute air bubbles may be reduced. In particular, where the inner diameter of the vessel body is 40 through 60 mm and the axial length thereof is 40 through 60 mm, and the diameter of the air/liquid jetting port is 5 through 10 mm, if the port diameter is made smaller than 0.01 mm or made larger than 0.5 mm, the above-described tendencies become further remarkable.

The suction-cleansing device according to the third aspect of the invention is constructed, in addition to the second aspect, so as to include a rotating member that is attached by being screwed in a threaded portion or being fitted to a fitting portion, which is opened and formed at the rear wall of the vessel body and is provided, in a covered manner, rotatably provided in a covered manner, centering around the position deviated from the axial center of the vessel body or the air axis formed in the vessel body, wherein the air self-suction port is formed at a position deviated from the rotating axis of the rotating member.

With the construction, the following actions and effects can be brought about in addition to those of the second aspect.

(1) Since the rotating member is rotatably provided so as to cover the rear wall of the vessel body centering around the position deviated from the center axis of the vessel body, and the air self-suction port is formed at a position deviated from the rotating axis of the rotating member, it is possible to adjust, by rotating and turning the rotating member, the area in which the projecting section of the air axis formed in the vessel body onto the rear wall and the air self-suction port overlap each other. By adjusting the area of the overlapping portion while increasing or decreasing the area, the suction resistance of the air self-suction port is varied, and the amount of air suctioned through the air self-suction port can be regulated.

(2) If a liquid is supplied from the liquid-introducing port of the vessel body in the tangential direction of the vessel body, a swirling stream is formed, and the pressure of the center portion of the vessel body is reduced, wherein air is suctioned through the air self-suction port disposed on the rear wall of the vessel body. Thus, an air axis consisting of the suctioned air can be formed at the center portion in the vessel body. Although the form of the air axis is varied on the basis of the pressure, flow amount and temperature of water supplied through the liquid-introducing pipe, it is possible to adjust the form of the air axis by varying the relative position between the center axis of the vessel body 2 and the air self-suction port 5 by turning the rotating member to a prescribed angle.

(3) Since the amount of air suctioned into the hollow portion can be adjusted by turning the rotating member, it is possible to finely vary the jetting amount of minute air bubbles and the suction force acting on the skin, wherein use efficiency of the suction-cleansing device is excellent.

Herein, the rotating member is a cover-shaped member that is provided so as to cover the rear wall of the vessel body in an enclosed state via its threaded portion or fitting portion, and the rotating member is devised so as to be rotatable to a prescribed angle with respect to the rotating axis secured on the rear wall of the vessel body.

It is preferable that the rotating axis of the rotating member is set to a position deviated in a range of 1 through 10% of the radius of the vessel body with respect to the axial center of the vessel body or the air axis formed in the vessel body. This is because, if the amount of deviation is smaller than 1% although it depends on the diameter of an applicable air self-suction port and the size of the vessel body, it becomes difficult to adjust the amount of air suctioned through the air self-suction port by adjustment of the rotating angle of the rotating member, and to the contrary, if the amount of deviation exceeds 10%, space for causing the rotating member to rotate on the rear wall of the vessel body is reduced, and it becomes difficult to carry out a prescribed rotating action. Therefore, it is not preferable that the amount of deviation is outside the above-described range.

In addition, the air axis is an aggregate portion of air formed at the center portion of the vessel body by a swirling water stream in the vessel body, and there are cases where the position at which the air axis is formed may change in compliance with the position of the liquid-introducing pipe, the form of the vessel body formed elliptical, etc., and the position of the air/liquid jetting port.

The suction-cleansing device according to the fourth aspect of the invention is constructed, in addition to the second or third aspect, so as to include a tank portion, provided so as to cover the rear wall of the vessel body or the rotating member, which supplies air via the air self-suction port, and an air introducing port secured at the tank portion.

With the construction, the following actions and effects can be brought about in addition to those in the second or third aspect.

(1) Since the suction-cleansing device is provided with a tank portion, the atmospheric air is not directly flown into the vessel body through the air self-suction port, wherein the suction resistance of air to be suctioned can be increased. Therefore, even if the diameter of the air self-suction port is increased, no large amount of air is suctioned, wherein the air/liquid jet-guiding portion can maintain a force for absorbing skin, and a high massaging effect can be brought about.

(2) Since the outer pressure fluctuation can be relieved by providing a tank portion having a large capacity, controlling of the size and form of minute air bubbles generated in streams of water and the amount of generation thereof can be stabilized and facilitated, wherein maneuverability thereof is excellent.

(3) Since the diameter of the air self-suction port can be increased, failures rarely occur due to clogging resulting from dust and dirt, wherein maintenance efficiency thereof is excellent.

Herein, the form of the tank portion may be cylindrical, semi-spherical, etc. The size and quantity of the tank ports may be adequately selected in response to a suction force required, velocity of swirling streams, quantity and grain size of minute air bubbles, etc.

The suction-cleansing device according to the fifth aspect of the invention is constructed, in addition to the first aspect, so as to include a water stream jetting nozzle portion whose tip end side is projected so as to be narrowed in its diameter from the rear part wall side of the vessel body and tip end opening portion is disposed inside the air/liquid jetting port, a plug-shaped, conically-shaped or inverted conically-shaped water stream regulating member disposed in the vicinity of the tip end of the nozzle via a rod-like supporting member inserted into the water stream jetting nozzle portion; and a position regulating and fixing portion, provided at the rear part wall side of the vessel body, which supports the base end side of the supporting member so as to advance and retreat or to be fixed.

With the construction, the following actions and effects can be brought about in addition to those of the first aspect.

(1) Since a portion of tap water or warm water, which is supplied through the liquid-introducing pipe, or tap water or warm water supplied from piping of a separate system can be directly jetted in the vicinity of the inside of the air/liquid jetting port via the water stream jetting nozzle portion in a high-pressure state, cleansing and massaging properties are excellent.

(2) Since a water stream regulating member is provided inside the tip end of the water stream jetting nozzle portion, it is possible to adequately maintain the jetting angle of streams of water and the air/liquid dispersed state by causing the water stream regulating member to advance and retreat or to be fixed at a prescribed position. For example, where the water stream regulating member is formed to be inversely conical-shaped, whose diameter is widened toward the tip end, since streams of water are jetted in a widening direction toward the jetting port of the nozzle, it is possible to cause the streams of water to flow together with a swirling stream that swirls and converges from the conical outer periphery of the water stream jetting nozzle portion. Therefore, the streams of water can be jetted like large water drops by suppressing both the jetting forces, and can be jetted like fine water drops with both streams merging with each other, wherein it is possible to adjust the streams of water in response to the cleansing and massaging conditions.

(3) In particular, where water supplied into the water stream jetting nozzle is heated and made into warm water, the amount of dissolution of air that can be dissolved in water is decreased in accordance with Henry's law, and super saturation arises. By causing the stream of water to pass through the negative pressure portion (pressure-reduced portion) of the vessel body, a great amount of dissolved air can be discharged, whereby a cleansing liquid and a massaging liquid, which are provided with a great amount of minute air bubbles, are obtained.

Herein, the water stream jetting nozzle portion is installed in a state where the tip end thereof is taken in from the rear wall side of the vessel body, tap water and warm water are supplied at a prescribed amount of flow through a bifurcated pipe branched from the liquid-introducing pipe and/or a separate piping system. It is preferable that the ratio (A/B) of the flow amount A of a liquid supplied from the water stream jetting nozzle portion and the flow amount B of a liquid supplied from the liquid-introducing pipe that is connected to the vessel body wall and forms a swirling stream is in a range of 0.1 through 0.8, preferably 0.2 through 0.5. This is because, although depending on the amount of dissolved gas in the tap water and the temperature thereof, such a tendency arises, by which the flow amount directly flown onto the skin decreases as the flow ratio (A/B) becomes smaller than 0.2, and the massaging effect of pressurizing the skin is worsened, and to the contrary such a tendency arises, by which a friction massaging effect brought about by a swirling stream decreases as the flow ratio (A/B) exceeds 0.5. These tendencies become further remarkable if the flow ratio becomes smaller than 0.1 or exceeds 0.8.

The water stream regulating member has its tip end formed to be inversely conical-shaped. By causing the tip end position thereof to advance or retreat to a prescribed position or to be fixed thereat, the space between the member and the nozzle tip end is regulated, wherein it is possible to carry out fine adjustment such as the flow amount, jetting angle, and foaming state, etc., of a cleansing water discharged from the air/liquid jetting port.

The suction-cleansing device according to the sixth aspect of the invention is constructed, in addition to any one of the first aspect to the fifth aspect of the invention, so as to include an inclined portion whose diameter is increased at a prescribed angle toward the jetting side on the inner circumferential wall of the air/liquid jetting port, and a flattened portion formed in contact with the front of the inclined portion.

With the construction, the following actions and effects can be brought about in addition to those of any one of the first aspect to the fifth aspect.

(1) Since an inclined portion whose diameter is widened toward the jetting side at a prescribed angle is provided at the inner circumferential wall of the air/liquid jetting port, the range of diffusion of minute air bubbles and streams of water including air bubble nucleation just before becoming minute air bubbles is limited in a prescribed angular range, and the pressure in the streams of water is decreased. The partial pressure reduction effectively facilitates growth from the air bubble nucleation to minute air bubbles.

(2) If the suction-cleansing device is used as a shower, since the suction-cleansing device has a flattened portion formed in contact with the front of the inclined portion, it is possible to adjust the jetting water drops by the flattened portion, supply water drops including a great amount of minute air bubbles in a stable state, and centralize the water drops at the middle part in the jetting direction.

(3) By adjusting the angle of the inclined portion, length A in the jetting direction, and length B in the jetting direction at the flattened portion in combinations in response to quality, pressure, flow amount and temperature, etc., of water supplied, it becomes possible to finely vary the size of minute air bubbles diffused in the streams of water and the aggregate form of air bubbles. Since the cleansing effect and massaging effect brought about by minute air bubbles fluctuate as a result of various factors such as form, etc., of the minute air bubbles, it is possible to establish combinations of (θ, A and B) of optimized values based on experiments.

Herein, although the angle θ of the inclined portion changes in accordance with the size of a vessel body used, flow amount and pressure of water supplied, and lengths A and B, it is preferable that the angle is in a range of 50 through 120 degrees, preferably still in a range of 73 through 79 degrees. This is because such a tendency arises, by which the distance to the skin is increased and the suction force is lowered if the angle θ of the inclined portion becomes smaller than 73 degrees, and to the contrary such a tendency is strengthened, by which the stream of water is diffused in a large area and the jetting direction cannot be centralized at the middle part if the angle θ exceeds 79 degrees. In addition, these tendencies are made further intensive if the angle θ of the inclined portion becomes smaller than 50 degrees or exceeds 120 degrees, and this is not preferable.

It is preferable that the lengths A and B in the jetting direction at the inclined portion and flattened portion are in a range of 0.5 times through 1.2 times the diameter d of the minimum diameter portion of the air/liquid jetting port. This is because if the lengths A and B of the inclined portion and flattened portion become smaller than 0.5 times the diameter d of the minimum diameter portion, a suppressing effect with respect to the direction of the water stream is lowered, and if the lengths A and B exceed 1.2 times the diameter d, the suction force is reduced.

That is, where the suction-cleansing device is used as a shower, water drops jetted from the air/liquid jetting port are liable to be made vacant in the central portion of the stream of water because it is jetted in a swirling state. However, by providing the flattened portion and inclined portion which are set to such adequate lengths, jetting water drops can be centralized at the middle part, and water drops can be applied to skin in an even state.

The suction-cleansing device according to the seventh aspect of the invention is constructed, in addition to any one of the first aspect through the sixth aspect, so as to include a flow-out portion provided by cutting off the front side edge portion of the air/liquid jet-guiding portion or opened to the front part side of the air/liquid jet-guiding portion.

With such a construction, the following actions and effects can be brought about in addition to those of any one of the first aspect through the sixth aspect.

(1) If a stream of water is jetted to skin with the front side edge portion of the air/liquid jet-guiding portion making contact with the skin, the swirling liquid is once reversed to the air axis side since the swirling liquid making contact with the skin is closer to the air axis at the central negative pressure portion than the flow-out portion side. Therefore, it is possible to absorb in a large area of skin at both the reversed negative pressure portion and the central negative pressure portion.

(2) Since a swirling stream can be flown outside the air/liquid jet-guiding portion through the flow-out portion even if the front end portion of the air/liquid jet-guiding portion is intensively pressed to the skin, it is possible to continuously cause the stream of water to flow onto the skin.

(3) Since a plurality of flow-out portions can be provided at the air/liquid jet-guiding portion, the swirling stream can be thereby effectively generated, and the flow or stream can be made complex to raise the massaging effect.

Herein, the flow-out portion is an opening or a notched portion that passes through the front and rear surfaces of the air/liquid jet-guiding portion and is drilled to be rectangular or circular, and is a part that is constructed so that a portion of the stream of water introduced into the air/liquid jet-guiding portion is caused to flow outwardly. The state of stream or flow in the air/liquid jet-guiding portion can be adjusted by the disposing pattern and opening area thereof.

The suction-cleansing device according to the eighth aspect of the invention is constructed, in addition to any one of the first aspect through the seventh aspect, so as to include a splash-preventing portion circumferentially provided toward the rear of the front side edge portion of the air/liquid jet-guiding portion.

With the construction, the following actions and effects can be brought about in addition to those of any one of the first aspect through the seventh aspect of the invention.

(1) Since the liquid flown out from the flow-out portion is moved to the rear of the opposite side of the skin side, it is possible to prevent streams of water from being splashed onto a user's face, etc.

(2) Where piping for collection of a liquid is provided at the splash-preventing portion, it is possible to use the suction-cleansing device without staining a bathroom and/or washroom, etc.

Herein, the splash-preventing portion is a wall-shaped portion secured so as to protrude to the rear side along the circumferential edge portion of the air/liquid jet-guiding portion, whereby the splash-preventing portion has a function of guiding a liquid, which is flown out through the flow-out portion open at the air/liquid jet-guiding portion, from the front end portion of the air/liquid jet-guiding portion to the rear side thereof.

The suction-cleansing device according to the ninth aspect of the invention is constructed, in addition to the seventh aspect, so as to include a water stream collecting portion for collecting streams of water discharged from the flow-out portion of the air/liquid jet-guiding portion.

With the construction, the following actions and effects can be brought about in addition to those of the seventh aspect of the invention.

(1) Since the water stream collecting portion is provided, there is no case where cleansing water is splashed to the surroundings to a great extent, wherein it is possible to prevent the surroundings from being stained, making it sanitary.

(2) Since an enclosed system in which water flows when jetting warm water, is formed with the air/liquid jet-guiding portion making contact with skin, pressure of streams jetting onto skin is increased, wherein a satisfactory cleansing effect and massage effect can be brought about.

The suction-cleansing device according to the tenth aspect of the invention is constructed, in addition to the ninth aspect, so as to include a flow-out regulating portion whose base end is rotatably disposed by means of a hinge on the circumferential edge portion of the air/liquid jet-guiding portion and whose roughly half-spherical circumferential edge portion shields the flow-out portion of the air/liquid jet-guiding portion.

With the construction, the following actions and effects can be brought about in addition to those of the ninth aspect of the invention.

(1) Since the flow-out regulating portion is rotatably provided at the circumferential edge portion of the air/liquid jet-guiding portion, the suction-cleansing device can be used with the flow-out portion, which communicates with the water stream collecting portion, shielded or open in response to the use conditions of a bathroom or washroom, etc. Therefore, the flow-out regulating portion is fitted to the air/liquid jet-guiding portion, and it may be used as a shower in which minute air bubbles are mixed, and may be used as a suction-cleansing device with the flow-out regulating portion open, wherein maneuverability and versatility are excellent.

(2) Since the flow-out regulating portion is attached via a hinge, the suction-cleansing device can be compactly accommodated with the flow-out regulating portion fitted to the air/liquid jet-guiding portion, and there is no fear that the flow-out regulating portion will be lost, making it convenient.

(3) Where the flow-out regulating portion is used as a carrier with the same fitted to the air/liquid jet-guiding portion, the tip end of an air axis formed inside the suction-cleansing device is fitted to the negative pressure fitting plate disposed at the middle of the flow-out regulating portion, wherein since no atmospheric air is suctioned, a shower that includes further minute air bubbles can be brought about.

The flow-out regulating portion is formed of plastic, etc., to be roughly semi-spherical. A negative pressure fitting plate is formed at the front side center thereof, and the rear side center thereof is made open, wherein the flow-out regulating portion is caused to communicate with the air/liquid jetting port when being attached to the air/liquid jet-guiding portion.

A cleansing apparatus according to the eleventh aspect of the invention is constructed by comprising a suction-cleansing device according to the first aspect through the tenth aspect of the invention and a pump for supplying a cleansing liquid into the liquid-introducing pipe of the suction-cleansing device.

With the construction, the following actions and effects can be brought about.

(1) Since the cleansing apparatus is composed of a suction-cleansing device of simple structure and a pump only, and is constructed of a small number of components, productivity thereof is excellent, and maintenance efficiency is also excellent.

(2) Since a liquid is only supplied to a suction-cleansing device by a pump, the cleansing apparatus can be simply installed not only indoors but also outdoors, for example, a campground, and it can be easily used.

(3) Where air is mixed in advance in a liquid that is supplied to a pump, air bubbles in the air/liquid mixed fluid are diffused by impellers rotating in the pump, wherein further minute air bubbles can be generated.

Herein, a turbo pump such as a radial flow pump, axial flow pump and mixed flow pump of such a type as to have a suction pipe and a discharge pipe, in which impellers are rotated in a vessel, and a capacity type pump such as a reciprocating pump, vane pump, geared pump, in which the space capacity is cyclically varied to suction and discharge a liquid, are applicable as the pump. Furthermore, an centrifugal pump in which impellers attached to the outer circumference of a disk and having a number of grooves are rotated at a high speed, a liquid placed between the outer casing and the outer circumferential portion of the impellers is flown on the circumference by rotations of the impeller, and the liquid is moved from a suction port to a discharge port, a jet pump in which water is suctioned up from a downward pipe by utilizing a vacuum state that is produced by jetting high-pressure water through a small nozzle hole at a high speed and causing the pressure at the outlet of the nozzle to be lowered, and a special pump such as an air bubble pump in which water air bubbles are moved upward together with water by causing compressed air to blow into the lower end of a column pipe inserted in water are applicable, as well.

The cleansing apparatus according to the twelfth aspect of the invention is constructed, in addition to the eleventh aspect, as a pump air self-suction port for suctioning air is provided in a suction pipe for supplying a cleansing liquid, which is attached to the suction side of the pump.

With the construction, the following actions and effects can be brought about in addition to those of the eleventh aspect of the invention.

(1) Since a pump air self-suction port for suctioning air is provided in the suction pipe of a pump for supplying a cleansing liquid, it is not necessary to suction air at the suction-cleansing device side, wherein stabilized supply of a prescribed amount of air can be facilitated, and maneuverability and convenience are excellent.

(2) Since it is possible to easily control the mixing ratio of air and liquid in an air/liquid mixed fluid, an adequate cleansing state can be maintained in response to use conditions.

(3) Since the state of an air/liquid mixed fluid can be easily maintained in a constant state during use, stability in operations of the cleansing apparatus is excellent.

Herein, the pump air self-suction port is a branch pipe which is bifurcated from the suction pipe of a pump and attached thereto and has a smaller pore diameter than the diameter of the suction pipe, and it is possible to adjust the suction amount by means of a pressure-fit type valve and needle valve in which the air suction amount can be adjusted by pressure-fitting a vinyl pipe, etc. Also, it is possible to mix air with a stream of water by suctioning air of the surroundings via the pump air self-suction port by an ejector effect of the stream of water flowing in the suction pipe.

DETAILED DESCRIPTION OF THE PREFERRED EMBODIMENTS

Embodiment 1

A description is given of a suction-cleansing device according to Embodiment 1 of the present invention with reference to the drawings.

FIG. 1(a) is a perspective view showing the major parts of a suction-cleansing device according to Embodiment 1, FIG. 1(b) is a side-sectional view showing the major parts thereof, FIG. 2(a) is a front elevational view showing the major parts thereof, and FIG. 2(b) is a rear view showing the major parts thereof.

Figure 1:
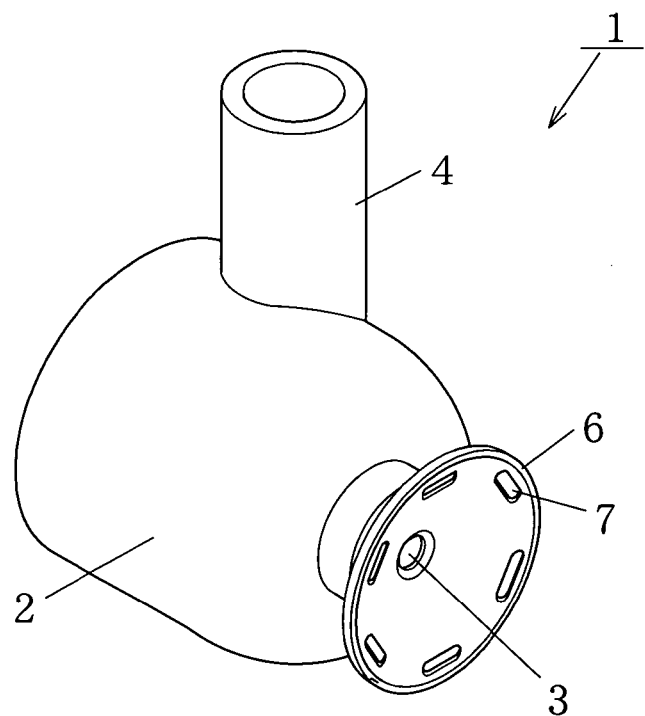
FIG. 1(a) is a perspective view showing the major parts of a suction-cleansing device according to Embodiment 1 of the invention.
FIG. 1(b) is a side sectional view showing the major parts of a suction-cleansing device according to Embodiment 1.
Figure 1:
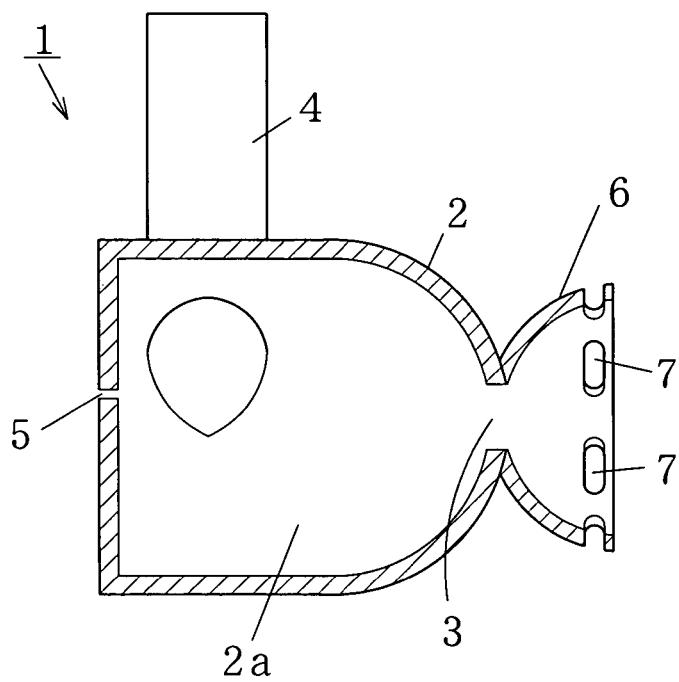
Figure 2:
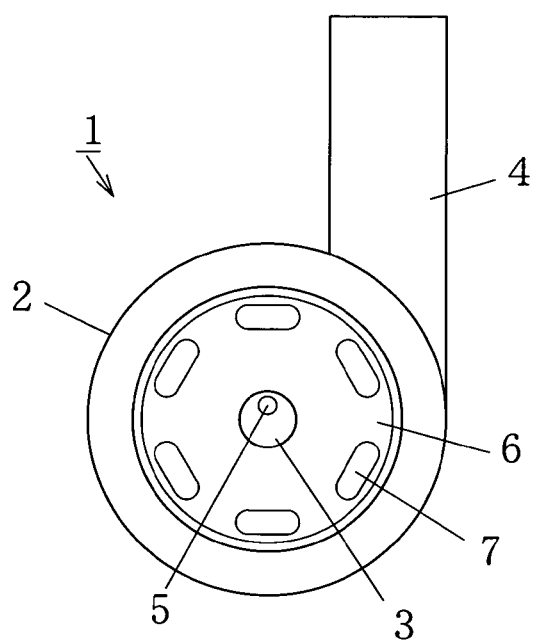
FIG. 2(a) is a front elevational view showing the major parts of a suction-cleansing device according to Embodiment 1.
FIG. 2(b) is a rear view showing the major parts of a suction-cleansing device according to Embodiment 1.
Figure 2:
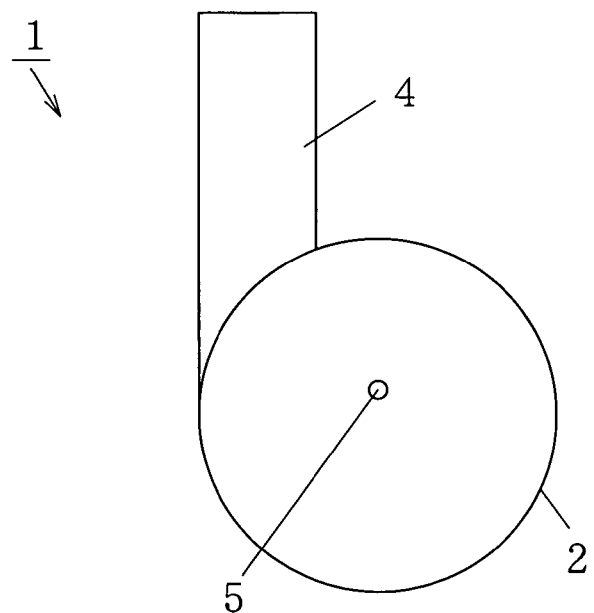

In FIG. 1 and FIG. 2, reference number 1 denotes a suction-cleansing device according to Embodiment 1. 2 denotes a vessel body which is formed of a synthetic resin, etc., and has a cannonball-shaped hollow portion 2a converging from the rear part side thereof toward the front part side. 3 denotes an air/liquid jetting port, which is formed at the front end portion of the center axis of the vessel body 2. 4 denotes a liquid-introducing pipe which is connected to the circumferential wall at the rear part side of the vessel body 2 in the tangential direction. 5 denotes an air self-suction port which is disposed at the rear wall of the vessel body 2 and drilled at a position deviated from the center position of the rear wall. 6 denotes an umbrella-shaped air/liquid jet-guiding portion which is disposed and formed at the circumferential portion of the air/liquid jetting port 3 and is widened to open from the air/liquid jetting port 3 toward the jetting direction. 7 denotes a plurality of flow-out portions which are drilled at the front part side of the air/liquid jet-guiding portion 6.

Also, in Embodiment 1, although the flow-out portions 7 are formed at the front part side of the air/liquid jet-guiding portion 6 with the port thereof opened, the flow-out portions may be composed as notches formed by cutting off the front end portion of the air/liquid jet-guiding portion 6.

With respect to the suction-cleansing device according to Embodiment 1 thus composed, a description is given of the actions thereof with reference to the drawings.

Figure 3:
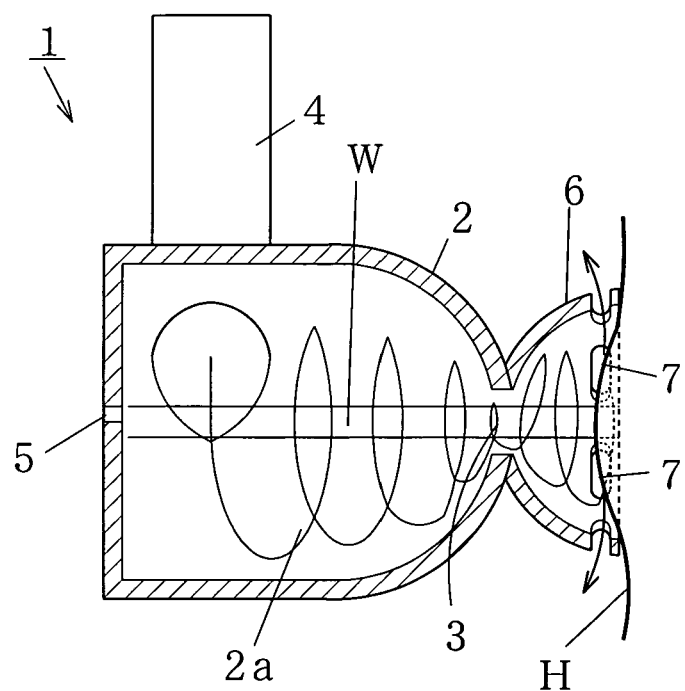
FIG. 3 is a side sectional view showing the major parts showing a use state of a suction-cleansing device according to Embodiment 1.

FIG. 3 is a side-sectional view of the major parts which show a use condition of a suction-cleansing device according to Embodiment 1.

In FIG. 3, reference number 1 denotes a suction-cleansing device according to Embodiment 1, 2 denotes a vessel body, 2a denotes a hollow portion, 3 denotes an air/liquid jetting port, 4 denotes a liquid-introducing pipe, 5 denotes an air self-suction port, 6 denotes an air/liquid jet-guiding portion, and 7 denotes a flow-out portion. Since the components are similar to those in FIG. 1 and FIG. 2, they are given the same reference numbers, and overlapping description thereof is omitted.

Reference symbol H denotes the skin of a user who uses the suction-cleansing device 1, W denotes an air axis (pressure-reduced portion) that is composed of air suctioned in the hollow portion 2a through the air self-suction port 5, has a tip end extending toward the air/liquid jetting port 3 and is formed to be rod-like.

The form of the air axis W formed in the vessel body 2 may change by pressure, flow amount and temperature, etc., of the water supplied through the liquid-introducing pipe 4. However, it is possible to vary the form to a large extent as a result of the relationship between the size of an opening portion of the air self-suction port 5 and the disposed position of the center axis of the vessel body 2 and the air self-suction port 5.

In Embodiment 1, the opening diameter of the air self-suction port 5 is made into approximately 0.01 through 0.1 mm, and the air self-suction port 5 is disposed at a position deviated by approximately 1 mm to 5 mm from the center position (the center axis of the vessel body) of the rear wall of the vessel body 2. Then, the air axis is formed in the hollow portion 2a.

In addition, the form and size of the air axis can be minutely varied by the amount of deviation, wherein it is possible to obtain a stream of water including prescribed minute air bubbles by which the cleansing effect and massaging effect can be optimized.

First, a liquid-introducing pipe 4 of the suction-cleansing device 1 is connected to a water-supply port provided in a house or the discharge port of a pump via a hose, etc., and a liquid is caused to flow from the liquid-introducing pipe 4 into the hollow portion 2a of the vessel body 2 from the tangential direction. Thus, the liquid flown in the hollow portion 2a is made into an air/liquid mixed fluid while swirling along the wall face of the hollow portion 2a and suctioning air through the air self-suction port 5, and is moved from the air/liquid jetting port 3 to the air/liquid jet-guiding portion 6. The air/liquid mixed fluid is made to collide with the skin H while swirling along the inner wall surface of the air/liquid jet-guiding portion 6 and is caused to flow from the flow-out portion 7 to the outside of the suction-cleansing device 1.

At this time, since a centrifugal force is caused to operate on the fluid by swirling actions and the center portion of the swirling flow is made into negative pressure (reduced pressure), air is continuously suctioned from the air self-suction port 5 into the hollow portion 2a to form an air axis W, and at the same time, the skin H at the front side of the air/liquid jet-guiding portion 6 is absorbed.

The tip end portion of the air axis W is torn by shearing forward of the skin H while swirling since the position of the air self-suction port 5 is deviated, and is diffused in swirling water streams after being made into minute air bubbles.

Thus, streams of water including minute air bubbles are turned in the direction of the air axis W at the edge portion of the air/liquid jet-guiding portion 6 along the skin H and is further turned in the vicinity of the air axis W. Then, the streams flow from the flow-out portion 7 to the outside. By causing such reversing actions of the streams of water to be effectively carried out, generation of minute air bubbles is facilitated in the fluid, wherein a large area of skin H can be continuously and intensively absorbed and cleansed.

In addition, dirt and stains are peeled off from the skin by virtue of mutual actions of minute air bubbles included in the streams of water and dirt such as old cuticles of the skin, and cleansing of the skin can be effectively carried out.

Since the suction-cleansing device according to Embodiment 1 is thus constructed, the following actions can be obtained.

(1) Since the skin H can be covered by the air/liquid jet-guiding portion 6 and swirling streams of an air/liquid mixed fluid including minute air bubbles can be continuously supplied to the skin H, a pressure-reduced portion is formed extremely close to the skin H and the skin H can be effectively suctioned, wherein a high massaging effect and a cleansing effect can be brought about.

(2) Since an air/liquid mixed fluid including minute air bubbles is made to collide with the skin, the collision of water streams with skin can be made mild, wherein a comfortable use can be brought about.

(3) An air axis is formed in the vessel body 2 by air suctioned through the air self-suction port 5. By mutual actions of the air axis and swirling stream in the hollow portion 2a, a prescribed amount of minute air bubbles is effectively generated with a prescribed pattern, wherein cleansing property is excellent.

(4) Since minute air bubbles are mixed in the swirling stream made to collide with the skin H and the minute air bubbles are adhered to the skin H and burst there, a massaging effect is applied to the skin H at a low frequency, and the skin H can be effectively massaged.

(5) The suction-cleansing device 1 does not include any unnecessary-components in the hollow portion 2a, has only a slight number of components, whereby the structure thereof is simple, the productivity and maintenance efficiency are excellent.

(6) Since the tip end of the air/liquid jet-guiding portion 6 is released from the skin H and the swirling stream is made into water drops which will be splashed, the suction-cleansing device can be used as a shower including minute air bubbles, wherein convenience thereof is excellent.

Embodiment 2

With reference to the accompanying drawings, a description is given of a cleansing apparatus according to Embodiment 2 of the invention, which is provided with a suction-cleansing device according to Embodiment 1 of the invention.

Figure 4:
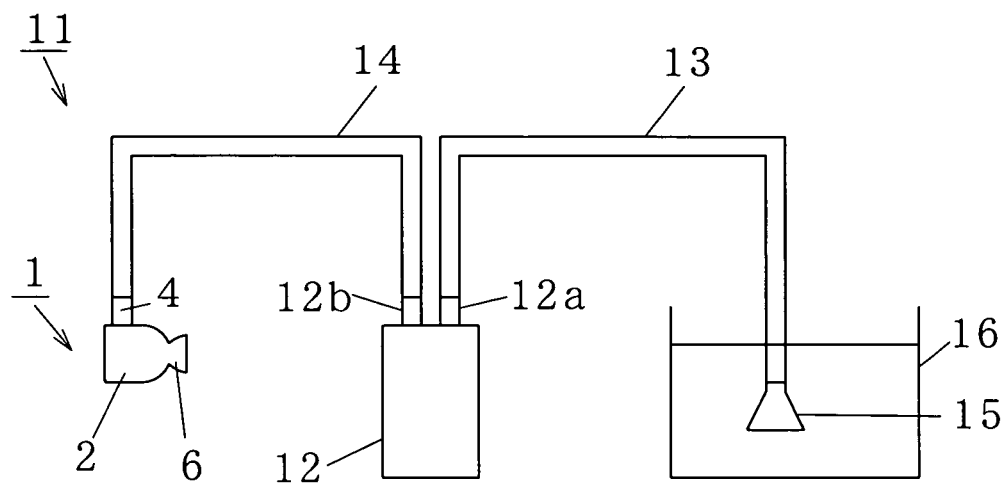
FIG. 4 is a general view showing a cleansing apparatus according to Embodiment 2 of the invention.

FIG. 4 is a general view of a cleansing apparatus according to Embodiment 2, which is provided with a suction-cleansing device according to Embodiment 1.

In FIG. 4, reference number 1 denotes a suction-cleansing device, 2 denotes a vessel body, 4 denotes a liquid-introducing pipe, and 6 denotes an air/liquid jet-guiding portion. These components are the same as those in Embodiment 1. Therefore, the components are given the same reference numbers, and description thereof is omitted.

Reference number 11 denotes a cleansing apparatus according to Embodiment 2, 12 denotes a pump such as a turbo pump and a capacity type pump, each of which is provided with a suction port 12a and a discharge port 12b. 13 denotes a suction pipe which has its downstream side connected to the suction port 12a of the pump 12, and 14 denotes a discharge pipe which has its upstream side connected to the discharge port 12b of the pump 12 and its downstream side connected to the liquid-introducing pipe 4 of the suction-cleansing device 1. 15 denotes a strainer which is connected to the upstream side opening portion of the suction pipe 13. 16 denotes a liquid tank such as a water tank and a bath, etc., in which the strainer 15 is immersed and a cleansing liquid is filled.

In addition, in Embodiment 2 of the present invention, a description was given of a case where the suction-cleansing device 1 is connected to the discharge side of the pump 12. However, Embodiment 2 is applicable to a mode in which the suction-cleansing device 1 is connected to the flow-out side of waterworks via a hose.

With respect to the cleansing apparatus according to Embodiment 2, which is constructed as described above, a description is given of the actions with reference to the drawings.

By driving the pump 12, a liquid in the liquid tank 16 is supplied to the liquid-introducing pipe 4 of the suction-cleansing device 1 via the strainer 15, suction pipe 13, pump 12 and discharge pipe 14.

A swirling stream is formed in the hollow portion 2a by the liquid supplied from the liquid-introducing pipe 4, whereby the pressure around the axial portion in the hollow portion 2a is reduced, and air is suctioned through the air self-suction port 5 secured in the rear wall of the vessel body 2. An air axis is formed with the suctioned air, the tip end portions of the air axis are torn and dispersed in the stream of water around the air axis and at the tip end portions of the air axis extending toward the air/liquid jetting port 3, wherein minute air bubbles can be generated.

At this time, by increasing or decreasing the output of the pump 12 to regulate the state of minute air bubbles generated in the suction-cleansing device 1 and by mixing air bubbles with a liquid supplied into the pump 12 in advance, a cleansing effect may be further increased. Also, if a surface active agent such as a detergent is mixed in a liquid and the interfacial tension of generated air bubbles is changed, shampoo cleansing is enabled, and at the same time it becomes possible to further adequately control the state of minute air bubbles.

Thus, since a stream of water including such minute air bubbles is discharged through the air/liquid jetting port 3, is caused to swirl between the air/liquid jet-guiding portion 6 and skin H, and is splashed onto the skin where it is used as a shower, it is possible to carry out cleansing and massaging of the skin H at the same time.

With a cleansing apparatus, according to Embodiment 2 of the invention, which is provided with a suction-cleansing device constructed as described above according to Embodiment 1, the following actions can be brought about in addition to those obtained in Embodiment 1.

(1) Since the cleansing apparatus 11 may be constructed of a suction-cleansing device 1 of a simple structure and a pump 12 and the number of components thereof can be decreased, productivity is excellent, and at the same time, maintenance efficiency is excellent.

(2) Since only a liquid is supplied into the suction-cleansing device 1 by a pump 12, the cleansing apparatus 11 may be installed not only indoors but also outdoors such as at a campground, etc., and the cleansing apparatus 11 can be very easily used.

(3) Where air introducing means such as an air introducing port, etc., is formed at the suction side of the pump 12, air bubbles of an air/liquid mixed fluid are made to contact with the impellers rotating in the pump, and are diffused in a minute scattered state. Therefore, further minute air bubbles can be generated.

(4) A liquid flown from the liquid-introducing pipe into the hollow portion 2a via the pump 12 is moved toward the air/liquid jetting port 3 while swirling along the circumferential wall face converging toward the front part side in the hollow portion 2a, and a pressure-reduced portion is formed at the middle part of the air/liquid jetting port 3, wherein air can be suctioned through the air self-suction port 5.

(5) By making the edge portion of the air/liquid jet-guiding portion 6 contact with the skin H to be cleansed or massaged, the skin is absorbed through the front of the air/liquid jet-guiding portion 6, the pressure of which is reduced by a swirling stream of the air/liquid mixed fluid, and a massaging effect can be brought about. Furthermore, a stream of water is torn at the tip end and surrounding portion at an air axis formed to be rod-shaped at the center portion of the vessel body 2 to generate minute air bubbles, and the air bubbles flows out through the space between the skin and the edge portion of the air/liquid jet-guiding portion 6 along with streams of water flowing on the skin, wherein the skin can be cleansed.

(6) Skin can be effectively covered with the air/liquid jet-guiding portion 6, the skin can be cleansed while maintaining a swirling stream including minute air bubbles on the skin, and simultaneously a pressure-reduced portion which is produced by the swirling stream is formed very close to the skin, wherein a large area of skin can be absorbed, and blood circulation can be improved.

(7) Since minute air bubbles of the swirling stream that are made to collide with skin are adhered to the skin and burst there, the skin is stimulated and activated. At the same time, a high massaging effect can be brought about.

(8) Since minute air bubbles can be reached close to hair roots, the minute air bubbles can be intensively made to contact with the skin, wherein oxidized sebaceous matter and old cuticles of the skin surface can be cleansed by a friction action and an action produced when minute air bubbles are burst.

Embodiment 3

A description is given of a suction-cleansing device according to Embodiment 3 with reference to the drawings.

FIG. 5(a) is a perspective view showing the major parts of a suction-cleansing device according to Embodiment 3, FIG. 5(b) is a side sectional view showing the major parts thereof, FIG. 6(a) is a front elevational view showing the major parts thereof, and FIG. 6(b) is a rear view showing the major parts thereof.

Figure 5:
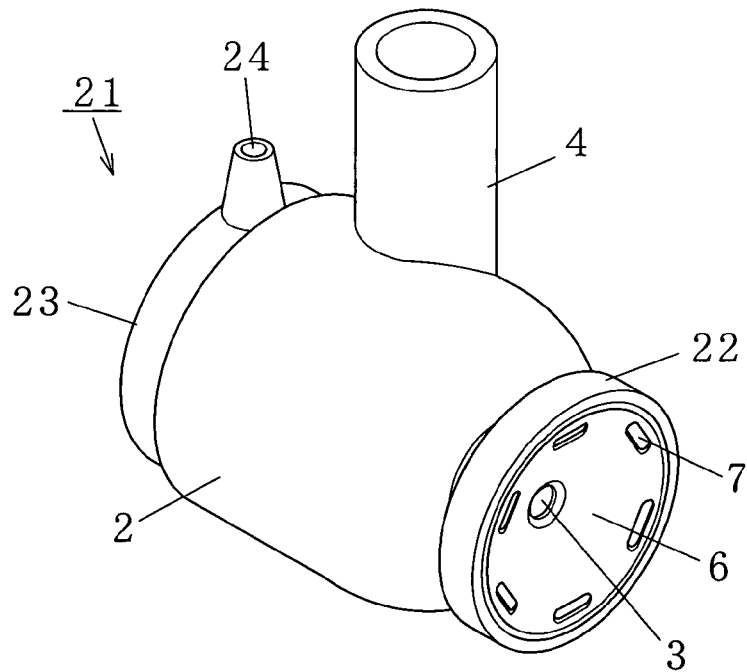
FIG. 5(a) is a perspective view showing the major parts of a suction-cleansing device according to Embodiment 3 of the invention.
FIG. 5(b) is a side sectional view showing the major parts of a suction-cleansing device according to Embodiment 3.
Figure 5:
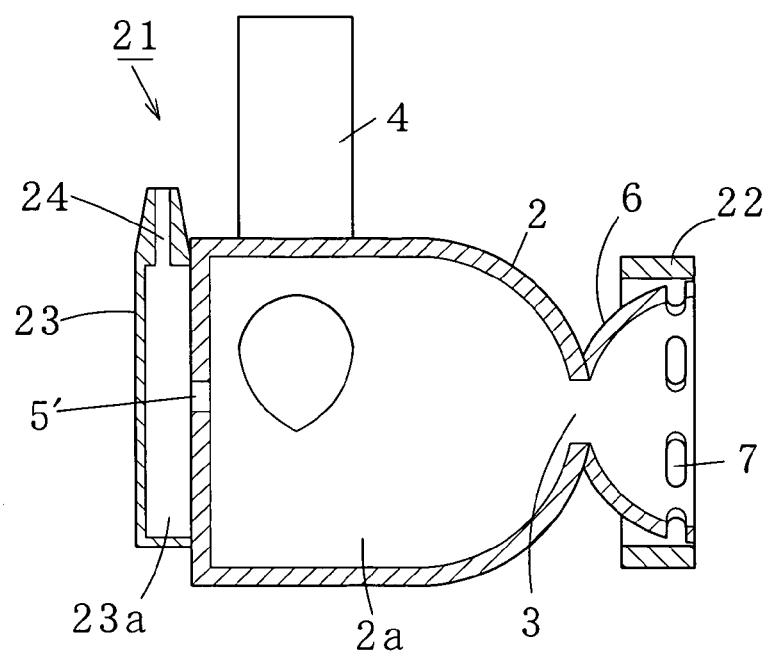
Figure 6:
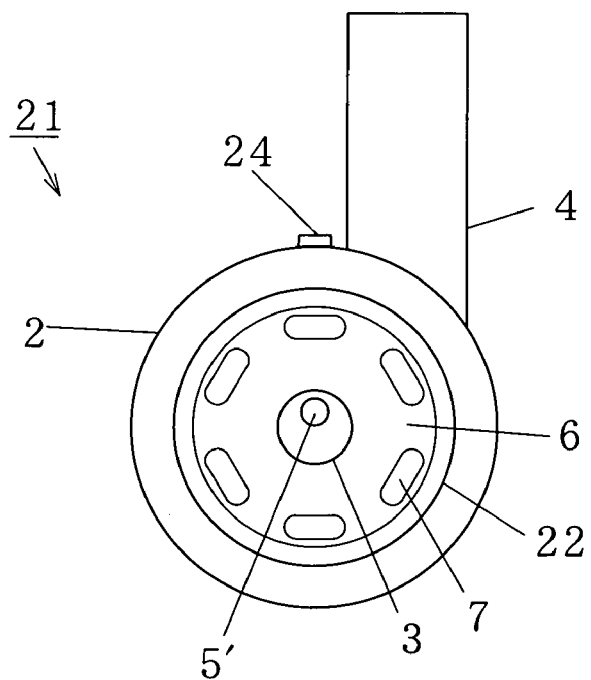
FIG. 6(a) is a front elevational view showing the major parts of a suction-cleansing device according to Embodiment 3.
FIG. 6(b) is a rear view showing the major parts of a suction-cleansing device according to Embodiment 3.
Figure 6:
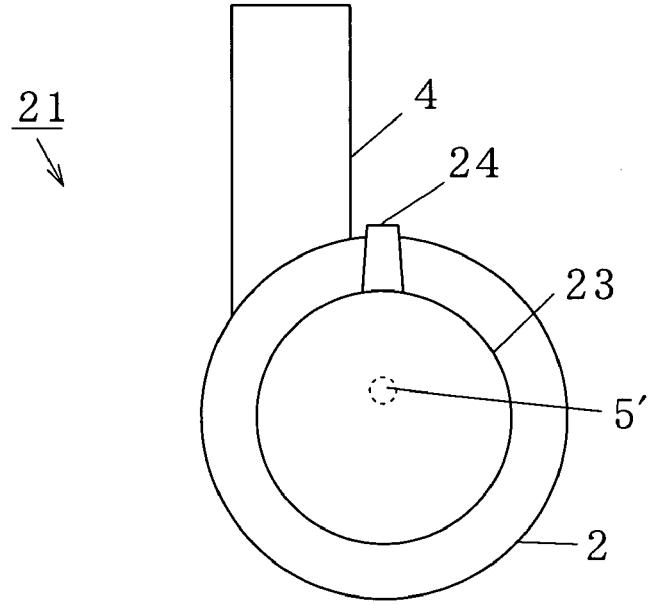

In FIG. 5 and FIG. 6, reference number 2 denotes a vessel body, 2a denotes a hollow portion, 3 denotes an air/liquid jetting port, 4 denotes a liquid-introducing pipe, 6 denotes an air/liquid jet-guiding portion, and 7 denotes a flow-out portion. These components are the same as those of Embodiment 1, wherein the components are given the same reference numbers and description thereof is omitted.

Reference number 5' denotes an air self-suction port which is opened larger than the air self-suction port 5 of Embodiment 1. 21 denotes a suction-cleansing device according to Embodiment 3. 22 denotes a splash-preventing portion which is circumferentially provided from the edge portion of the air/liquid jet-guiding portion 6 to the rear. 23 denotes a tank portion which is disposed on the rear wall of the vessel body 2 and has a tank side hollow portion 23a that communicates with the hollow portion 2a of the vessel body 2 via the air self-suction port 5'. 24 denotes a tank port which is made open at the upper side of the tank portion 23.

The suction-cleansing device 21 according to Embodiment 3 differs from the suction-cleansing device 1 according to Embodiment 1 in that the suction-cleansing device 21 has the tank portion 23, tank port 24, and splash-preventing portion 22, and the air self-suction port 5' is formed larger than the air self-suction port 5 according to Embodiment 1.

In addition, the diameter of the tank port 24 is formed larger than that of the air self-suction port 5', thereby reducing the resistance when suctioning air from the outside, wherein a fluctuation due to breathing can be eliminated, and air can be supplied into tap water and warm water in a stable state.

With respect to the suction-cleansing device 21, constructed as described above, according to Embodiment 3, a description is given of the actions with reference to the drawings.

Figure 7:
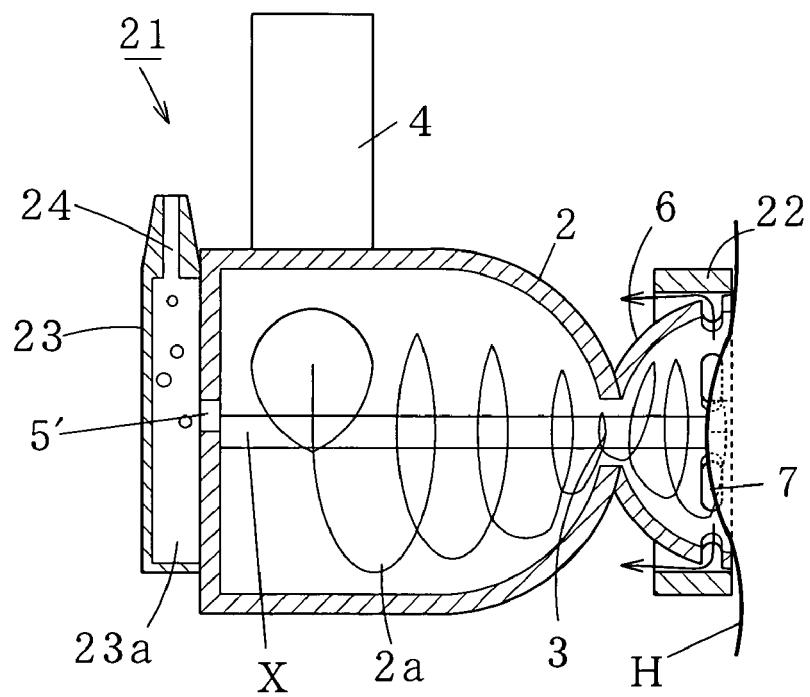
FIG. 7 is a view describing a use state of a suction-cleansing device according to Embodiment 3.

FIG. 7 is a view describing use states of the suction-cleansing device according to Embodiment 3 of the invention.

In FIG. 7, reference number 2 denotes a vessel body, 2a denotes a hollow portion, 3 denotes an air/liquid jetting port, and 4 denotes a liquid-introducing pipe. An air self-suction port 5' has a caliber formed to be approximately 2.5 through 3.5 mm. Reference number 6 denotes an air/liquid jet-guiding portion, 7 denotes a flow-out portion, 21 denotes a suction-cleansing device according to Embodiment 2, 22 denotes a splash-preventing portion, 23 denotes a tank portion, 23a denotes a tank-side hollow portion, and 24 denotes a tank port. Since these components are the same as those in FIG. 5 and FIG. 6, the components are given the same reference numbers, and overlapping description thereof is omitted. Also, reference symbol H denotes skin. The skin is the same as that in FIG. 3, wherein the same reference symbol is given thereto, and description thereof is omitted.

The tank portion 23 is a liquid reservoir that is provided so as to cover the rear wall of the vessel body 2 and is formed to be cylindrical, and is caused to communicate with the hollow portion 2a via the air self-suction port 5' formed on the rear wall. The tank portion 23 is formed to have almost the same diameter as that of the vessel body 2 and has a capacity which is equivalent to approximately $\frac{1}{20}$ through $\frac{1}{40}$ times the capacity of the vessel body 2. The tank portion 23 is adhered to the rear wall of the vessel body 2 by means of an adhesive agent, etc. However, it may be formed integral with the vessel body.

The tank port 24 is formed at the upper part of the tank portion 23, and the pore diameter thereof is approximately 0.5 through 5 mm. The atmospheric air can be suctioned through water reserved in the tank portion 23.

Reference symbol X is an air axis formed from the air self-suction port 5' to the air/liquid jetting port 3 and skin H in the hollow portion 2a of the vessel body 2.

First, the liquid-introducing pipe 4 of the suction-cleansing device 1 is connected to a faucet of a waterworks and the discharge port side of a pump, and a liquid is caused to flow in from the liquid-introducing pipe 4 into the hollow portion 2a of the vessel body 2 in the tangential direction.

A liquid flown into the hollow portion 2a is moved from the air/liquid jetting port 3 to the air/liquid jet-guiding portion 6 while swirling along the wall face of the hollow portion 2a, and is made to collide with skin H while swirling along the inner wall face of the air/liquid jet-guiding portion 6. Finally, the liquid flows from the flow-out portion 7 outside the suction-cleansing device 21 through the inner wall face of the splash-preventing portion 22.

At this time, the liquid swirls along the circumferential wall of the vessel body 2 and a centrifugal force operates thereon. And, the pressure in the vicinity of center of the swirling stream is reduced, wherein air is continuously suctioned through the air self-suction port 5' disposed roughly at the central position of the rear wall, and an air axis X is formed in the hollow portion 2a. Simultaneously, skin H at the front side of the air/liquid jet-guiding portion 6 is absorbed.

Air collected in and around the air axis X is torn by a shearing force of the swirling stream between the tip end portion of the air axis and the skin H, is made into minute air bubbles and is diffused, wherein the minute air bubbles flow out through the flow-out portion 7 along with the swirling stream along the skin H.

Herein, the suction-cleansing device 21 is different from the suction-cleansing device 1 according to Embodiment 1, wherein the hollow portion 2a does not communicate directly with the atmospheric air via the air self-suction port but communicates with the tank side hollow portion 23a of the tank portion 23. Since the tank side hollow portion 23a communicates with the atmospheric air via the tank port 24, the suction resistance is increased.

For this reason, although the air self-suction port 5' is formed larger than that in Embodiment 1, the flow amount of air suctioned into the hollow portion 2a becomes almost equivalent to that in Embodiment 1.

In addition, since a liquid is reserved in the tank side hollow portion 23a, the suction resistance of the air self-suction port 5' is further increased, and the flow amount of air suctioned into the hollow portion 2a can be reduced.

With the suction-cleansing device, constructed as described above, according to Embodiment 3, the following actions can be brought about in addition to those obtained in Embodiment 1.

(1) Since hydraulic pressure is applied to the portion of the air self-suction port 5' with water reserved in the tank portion 23 by providing the tank portion 23 and the suction resistance of the air self-suction port 5' can be increased, any excessive amount of air is not suctioned even if the diameter of the air self-suction port 5' is increased, wherein a flow of an air/liquid mixed fluid can be stably maintained. Thus, it is possible to prevent the suction force from being lowered due to excessive suction of air, and a high massaging effect can be brought about.

(2) An excessive amount of air is not suctioned even if the diameter of the air self-suction port 5' is increased, and the size of jetting air bubbles is not increased, wherein it is possible to continuously jet minute air bubbles in a stable state, and a high cleansing effect and a high massaging effect can be brought about.

(3) Since the diameter of the air self-suction port 5' can be increased, failures rarely occur due to clogging resulting from dust and dirt, wherein maintenance efficiency thereof is excellent.

(4) Since the suction-cleansing device is provided with a splash-preventing portion 22, a liquid flown out from the flow-out portion 7 is not splashed to the front, wherein use efficiency thereof is excellent.

Embodiment 4

A description is given of a suction-cleansing device according to Embodiment 4 of the invention with reference to the following drawings.

Figure 8:
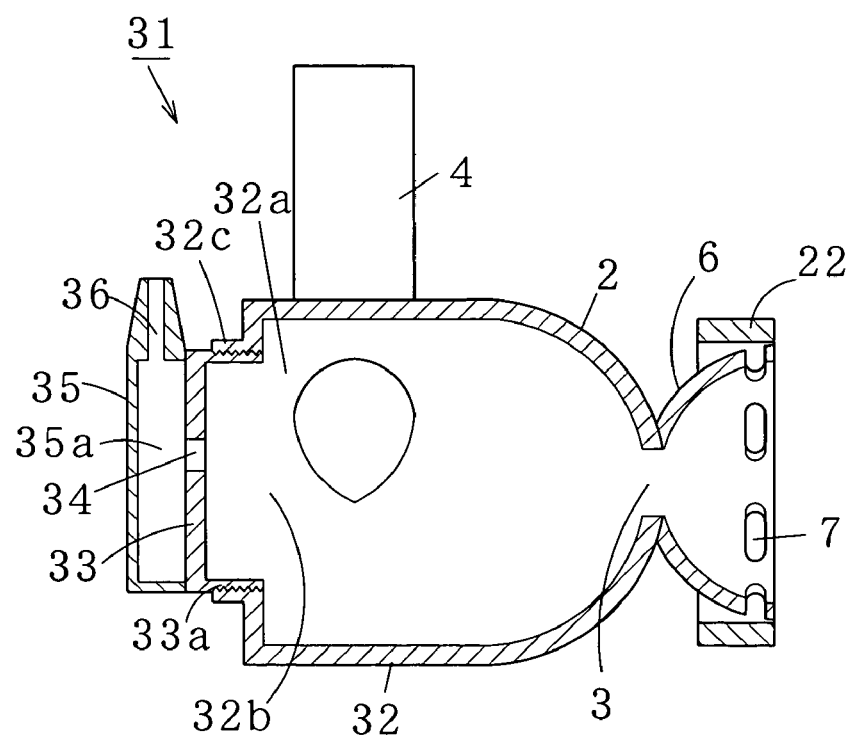
FIG. 8 is a side sectional view showing the major parts of a suction-cleansing device according to Embodiment 4 of the invention.

FIG. 8 is a side sectional view showing the major parts of the suction-cleansing device according to Embodiment 4.

In FIG. 8, reference number 3 denotes an air/liquid jetting port, 4 denotes a liquid-introducing pipe, 6 denotes an air/liquid jet-guiding portion, 7 denotes a flow-out portion, and 22 denotes a splash-preventing portion. Since these components are the same as those in Embodiment 3, the components are given the same reference numbers, and description thereof is omitted.

Reference number 31 denotes a suction-cleansing device according to Embodiment 4. 32 denotes a vessel body which has a hollow portion 32a shaped so as to converge from the rear part thereof toward the front end portion thereof and has an opening portion 32b at the rear wall thereof. 32c denotes a female threaded portion which is erected along the edge portion of the opening portion 32b. 33 denotes a rotating member which is rotatably provided so as to cover the opening portion 32b with a male threaded portion 33a screwed in the female threaded portion 32c. 34 denotes an air self-suction port which is made open in the rotating member 33. 35 denotes a tank portion which is disposed on the rear wall of the rotating member 33 and has a tank side hollow portion 35a that communicates with the hollow portion 32a of the vessel body 32 via the air self-suction port 34. 36 denotes a tank port which is made open at the upper side of the tank portion 35.

The suction-cleansing device 31 according to Embodiment 4 differs from the suction-cleansing device 21 according to Embodiment 3 in that the rotating member 33 is provided so as to cover the opening portion 32b of the vessel body 32 so as to be screwed therein and unscrewed therefrom, and the tank portion 35 is disposed on the rotating member 33.

In addition, although a step is formed on the rear wall side of the vessel body 2 by the female threaded portion 32c, the step does not obstruct the swirling water stream in the vessel body 2 if the length of the female threaded portion 32c is made shorter by 1/10 times or less the axial length of the vessel body 2. And, an air bubble generating state can be maintained in a satisfactory condition.

With respect to the suction-cleansing device, constructed as described above, according to Embodiment 4, a description is given of the actions with reference to the drawings.

Figure 9:
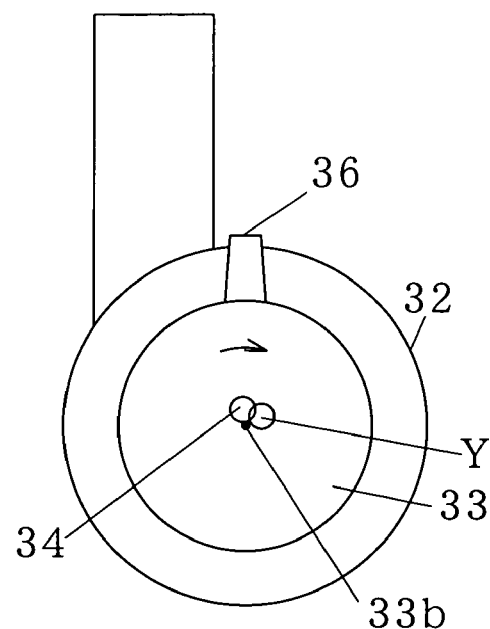
FIG. 9 is a sectional view of the rear side, showing the major parts for describing the overlapping of an air self-suction port and an air axis in Embodiment 4.

FIG. 9 is a sectional view of the rear side, showing the major parts for describing the overlapping of an air self-suction port and an air axis in Embodiment 4;

In FIG. 9, reference number 32 denotes a vessel body, 33 denotes a rotating member, and 34 denotes an air self-suction port. These components are the same as those in FIG. 8. Therefore, the components are given the same reference numbers, and overlapping description thereof is omitted.

Reference number 33b denotes the rotating axis of the rotating member 33. Reference symbol Y denotes an air axis that is formed from the air self-suction port 5 toward the air/liquid jetting port 3 and skin H in the hollow portion 2a of the vessel body 2. The air self-suction port 34 is drilled with a slight shift from the rotating axis 33b, whereby it is possible to regulate the area of an overlapping portion of the air axis Y formed in the vessel body 32 and the air self-suction port 34 when being observed in the axial direction by turning the rotating member 33. By adjusting the overlapping portion, it is possible to adjust the suction resistance of the air self-suction port 34, and the amount of air suctioned through the air self-suction port 34 whereby its form can be adjusted.

Also, operations other than adjustment of the overlapping portion of the air self-suction port and the air axis are the same as those in Embodiment 3. Therefore, the description is omitted.

Since the suction-cleansing device according to Embodiment 4 is constructed as described above, the following actions can be brought about in addition to those obtained in Embodiment 1.

(1) The rotating member 33 is provided so as to cover the rear wall of the vessel body 2 with its rotating axis deviated from the center of the vessel body 2, and the air self-suction port 34 is formed at a position deviated with respect to the rotating axis. Therefore, by rotating or turning the rotating member 33, it is possible to adjust the area of an overlapping portion of the projection section of the air axis Y formed in the vessel body 2 onto the rear wall and the air self-suction port 34. By varying the suction resistance from the air self-suction port 34, it is possible to adjust the amount of air suctioned through the air self-suction port 34.

(2) The pressure in the central portion of the vessel body 2 is reduced by a swirling stream of liquid, and air is suctioned through the air self-suction port 34 disposed on the rear wall of the vessel body 2, wherein it is possible to form an air axis at the central portion in the vessel body 2. The form of the air axis Y can be adjusted by turning the rotating member to a prescribed degree of angle, wherein maneuverability thereof is excellent.

Embodiment 5

A description is given of a cleansing apparatus including the suction-cleansing device according to Embodiment 5 with reference to the drawings.

Figure 10:
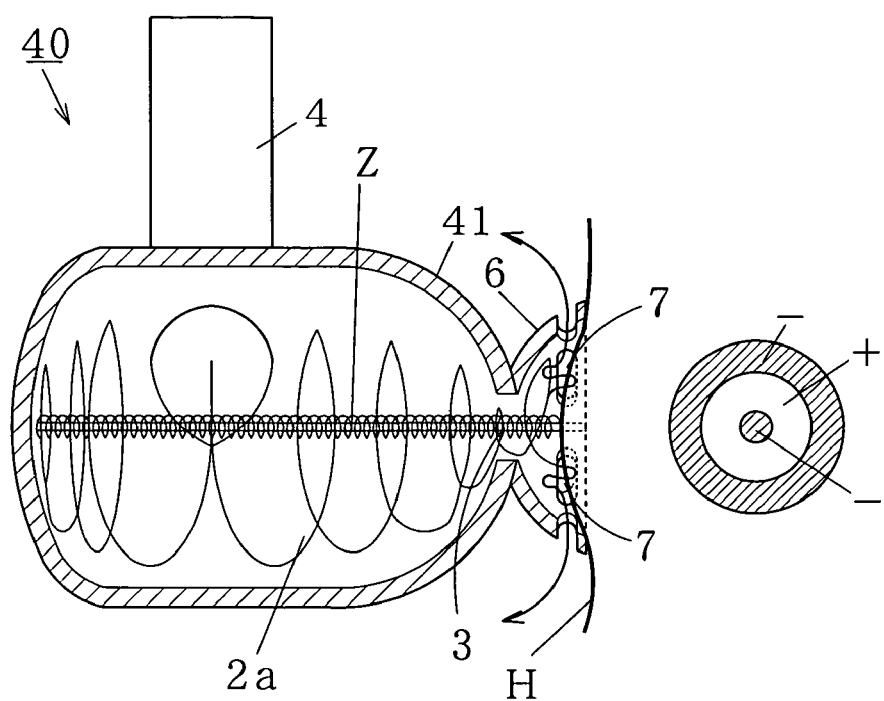
FIG. 10 is a view describing a use state of a suction-cleansing device according to Embodiment 5 of the invention.

FIG. 10 is a view describing a use state of the suction-cleansing device in Embodiment 5.

In FIG. 10, reference number 40 denotes a suction-cleansing device according to Embodiment 5, and 41 denotes a vessel body the rear wall of which is formed to be curved. Therefore, a stream of water is made to collide with the curved rear wall and is reversed, and can be jetted outwards while rotating at a high speed at a position very close to the center portion. With high speed rotations, the axial portion of rotations is maintained in a pressure-reduced state, and air dissolved at maximum is released into liquid such as water of waterworks to form an air axis. In addition, parts which are identical to those in Embodiment 1 are given the same reference numbers, and description thereof is omitted.

Reference symbol Z is an air axis that is formed by concentrating air contained in a liquid (water) supplied through the liquid-introducing pipe 4 at the center portion of the hollow portion 2a.

Also, the rear wall of the vessel body 41 may be formed to be swelled like a projection outwards or may be formed of a flat vertical wall.

Figure 11:
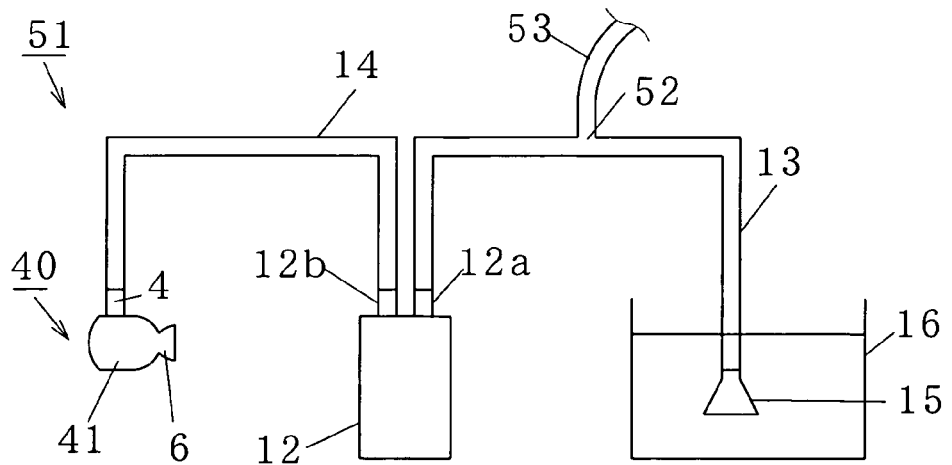
FIG. 11 is a general view showing a cleansing apparatus according to Embodiment 5.

Herein, FIG. 11 is a general view of a cleansing apparatus provided with a suction-cleansing device.

In FIG. 11, reference number 4 denotes a liquid-introducing pipe, 6 denotes an air/liquid jet-guiding portion, 12 denotes a pump, 12a denotes a suction port of the pump 12, 12b denotes a discharge port of the pump 12, 13 denotes a suction pipe communicating with the suction port 12a, 14 denotes a discharge pipe by which the liquid-introducing pipe 4 is connected to the discharge portion 12b, 15 denotes a strainer secured at the opening portion of the suction pipe 13, 16 denotes a liquid tank in which a cleansing liquid is reserved and the strainer 15 is immersed, and 41 denotes a suction-cleansing device according to Embodiment 5. These components are the same as those in Embodiments 2 and 5. Therefore, the components are given the same reference numbers, and description thereof is omitted.

51 denotes a cleansing apparatus which is provided with a suction-cleansing device 40 according to Embodiment 5. 52 denotes a pump air self-suction port which is drilled at a prescribed portion of the suction pipe 13. 53 denotes an air self-suction pipe which has one end thereof connected to the pump air self-suction port 52 and is provided with a needle valve or a pressure-fit type valve by which the suction amount can be adjusted.

A description is given of the actions of the cleansing apparatus 51 constructed as described above, with reference to the drawings.

By driving the pump 12, a liquid in the liquid tank 16 is suctioned into the suction pipe 13 via the strainer 15. Air is suctioned from the air self-suction pipe 53 into the suction pipe 13 as an accompanying stream of the liquid when the liquid passes through the suction pipe 13, and the liquid in which air is mixed (that is, an air/liquid mixed fluid) is suctioned from the suction port 12a into the pump 12. The air bubbles are diffused by impellers in the pump 12, and are supplied into the liquid-introducing pipe 4 of the suction-cleansing device 40 via a discharge pipe 14.

If the air/liquid mixed fluid is flown from the liquid-introducing pipe 4 into the hollow portion 2a of the vessel body 2 in the tangential direction, the air/liquid mixed fluid flown into the hollow portion 2a is moved from the air/liquid jetting port 3 to the air/liquid jet-guiding portion 6 while swirling along the wall face of the hollow portion 2a, is made to collide with skin H while swirling along the inner wall face of the air/liquid jet-guiding portion 6, and is caused to flow outside the suction-cleansing device 40 through the flow-out portion 7.

At this time, since the pressure at the central portion of the swirling stream is reduced, air mixed in the fluid in advance is accumulated at the central portion of the swirling stream, wherein an air axis Z is formed, and at the same time, the skin H is absorbed from the front of the air/liquid jet-guiding portion 6. Air collected in the air axis Z is torn between the skin H and the swirling stream and is made into minute air bubbles. After that, the air is flown out from the flow-out portion 7 along the skin H together with the swirling stream.

Furthermore, since air in the liquid can form an air axis by being released from the liquid under a pressure-reduced state as described above even if the valve of the air self-suction pipe 53 is closed, minute air bubbles can be effectively generated at the tip end of the air axis.

Since the cleansing apparatus 51 including the suction-cleansing device 40 according to Embodiment 5 is constructed as described above, the following actions can be brought about.

(1) Since the cleansing apparatus does not include fine pores such as an air self-suction port, etc., failures rarely occur due to clogging resulting from dust and dirt, wherein maintenance efficiency thereof is excellent.

(2) Where a liquid in which a prescribed amount of air is dissolved is used, it is possible to maintain an air axis formed in the hollow portion in a stable state, and cleansing and massaging can be carried out in a stable state by using a stream of water including a fixed form of minute air bubbles at all times.

(3) Since the swirling stream formed in the hollow portion 2a of the vessel body 2 can grow and expand air bubble nucleation in a liquid by means of mutual actions between the vessel body wall and air/liquid jet-guiding portion 6, the air axis Z can be effectively formed without any air self-suction port. Furthermore, the air bubble nucleation is liable to remarkably grow in line with an increase in temperature, and it is preferable that the temperature of water to be used is around 40° C., favorably 40° C. through 45° C. Also, in a case where the temperature of a liquid is low, it is possible to supply air, which is short in liquid, through the air self-suction pipe 53.

(4) Since air bubbles in the air/liquid mixed fluid are diffused by impellers in the pump 12, further minute air bubbles can be generated.

(5) Since air is suctioned from the air self-suction pipe 53 into the suction pipe 13 as an accompanying stream of the liquid when the liquid passes through the suction pipe 13, air can be mixed in a further controlled environment, wherein maneuverability and control characteristics are excellent.

Embodiment 6

A description is given of a suction-cleansing device according to Embodiment 6 of the invention with reference to the drawings.

Figure 12:
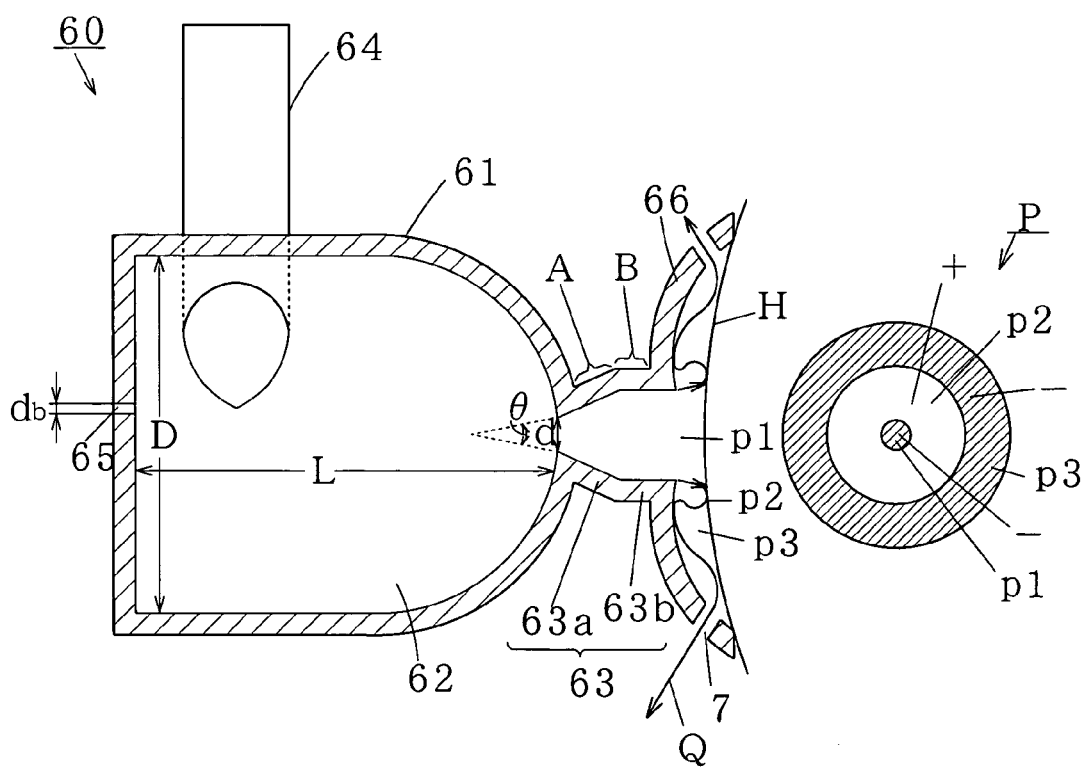
FIG. 12 is a general view showing a use state of a suction-cleansing device according to Embodiment 6 of the invention.

FIG. 12 is a general view showing a use pattern of a suction-cleansing device according to Embodiment 6.

In FIG. 12, reference number 60 denotes a suction-cleansing device according to Embodiment 6. 61 denotes a vessel body which has a cannonball-shaped hollow portion 62 converging from the rear part side thereof toward the front part side thereof, the maximum inner diameter D of which is 30 through 90 mm, and is made of synthetic resin. 63 denotes an air/liquid jetting port having the minimum diameter d of 5 through 10 mm, which has an inclined portion 63a formed at the front end portion of the vessel body 61 and a flattened portion 63b communicating with inclined portions 63a. 64 denotes a liquid-introducing pipe which is connected to the circumferential wall at the rear part side of the vessel body 61 in the tangential direction. 65 denotes an air self-suction port which is disposed on the rear wall of the vessel body 61 and drilled at a position deviated from the center position of the rear wall. 66 denotes an umbrella-shaped air/liquid jet-guiding portion which is disposed at the periphery of the air/liquid jetting port 63 and is widened to open from the air/liquid jetting port 63 in the jetting direction. Reference symbol P denotes pressure distributions p1 through p3, formed to become annular, in which a low-pressure zone and a high-pressure zone are alternately formed on the skin H by a stream of an air/liquid mixed fluid, and Q denotes the stream direction of the air/liquid mixed fluid.

The inclined portion 63a is a portion of the air/liquid jetting port 63, whose diameter is widened toward the air/liquid jet-guiding portion 66 at an angle θ from 60 through 85 degrees with a length A of 1 through 10 mm, and the flattened portion 63b is a portion of the air/liquid jetting port 63, which extends toward the air/liquid jet-guiding portion 66 with a length B of 1 through 10 mm.

Furthermore, the angle θ, lengths A and B are optimally determined, depending on a liquid flown through the liquid-introducing pipe 4, inner diameter D of the vessel body 61 and length L (axial length) in the axial direction. The present embodiment employed the inner diameter D=40 mm, axial length L=50 mm, minimum diameter of the air/liquid jetting port d=7.5 mm, diameter of the air self-suction port db=0.5 mm, length A=3.2 mm, length B=2.6 mm, and hydraulic pressure P=3×10$^5$ Pa (approximately 3 kgf/cm$^2$).

Also, the suction-cleansing device 60 according to Embodiment 6 differs from the suction-cleansing device 1 according to Embodiment 1 in that the air/liquid jetting port 63 has an inclined portion 63a and a flattened portion 63b communicating with the inclined portion 63a.

A description is given of the actions of the suction-cleansing device 60 that is constructed as described above.

A prescribed amount of liquid having prescribed pressure is supplied from the liquid-introducing pipe 64 into the hollow portion 62 of the vessel body 61 in the tangential direction. At this time, the liquid flown in the hollow portion 62 swirls along the wall face of the hollow portion 62, a pressure-reduced portion is formed at the center portion of the vessel body.

By the pressure-reduced portion, air is suctioned from the air self-suction port 65 disposed in the vicinity of the center of the rear wall of the vessel body 61, and an air axis is formed at the pressure-reduced portion in the hollow portion 62. Minute air bubbles are generated in the liquid by mutual actions of the air axis and swirling stream.

Thus, a stream of water including minute air bubbles is moved along the air/liquid jet-guiding portion 66 via the inclined portion 63a and flattened portion 63b which are formed on the inner wall of the air/liquid jetting port 63, and is discharged between the circumferential edge of the air/liquid jet-guiding portion 66 and skin.

Also, in a case where a flow-out portion 7 is provided, which has a notched portion and an opening portion formed in the air/liquid jet-guiding portion 66, even when the front end portion of the air/liquid jet-guiding portion is strongly pressed to the skin, it is possible to cause a swirling stream to flow from the flow-out portion 7 outside the air/liquid jet-guiding portion 66. Also, it is thereby possible to continuously cause a stream of water to flow onto skin, and at the same time it becomes possible to adjust the flow state in the air/liquid jet-guiding portion by the disposing pattern and opening area of the flow-out portion.

The air/liquid mixed fluid jetted from the air/liquid jetting port 63 flows in spacing placed between the skin H and the air/liquid jet-guiding portion 66 and forms pressure distribution P (p1 through p3) having an annular low-pressure zone and an annular high-pressure zone. After that, the fluid composes a stream Q of air/liquid mixed fluid and is discharged through the flow-out portion 7. Since such a low-pressure zone and a high-pressure zone can be formed on the skin H alternately, blood circulation of the skin can be improved, and simultaneously stains on the skin can be effectively removed.

Since the suction-cleansing device 60 according to Embodiment 6 is constructed as described above, the following actions can be brought about in addition to those obtained by Embodiment 1.

(1) Since an inclined portion 63a whose diameter is widened at a prescribed angle toward the jetting side is provided on the inner circumferential wall of the air/liquid jetting port 63, the range, in which a stream of water including minute air bubbles and air bubble nucleation before becoming minute air bubbles is diffused, is limited to a prescribed angle or less, and the pressure in the stream of water can be reduced. The partial pressure reduction can effectively facilitate growth from air bubble nucleation into minute air bubbles.

(2) Where the suction-cleansing device is used as a shower, since it is provided with a flattened portion 63b formed to communicate with the front of the inclined portion 63a, it is possible to adjust the water drops jetted from the flattened portion 63b, and water drops including a great amount of minute air bubbles can be supplied in a stable state. In addition, water drops thus jetted can be collected at the central portion.

(3) It is possible to adjust the angle θ of the inclined portion 63a, length A in the jetting direction, and length B in the jetting direction on the flattened portion 63b within an adequate range by combinations thereof in response to use conditions such as quality, pressure, flow amount and temperature of supplied water, for example, in response to the use conditions in a bathroom or at a pool side. The size of minute air bubbles and aggregate form of air bubbles, etc., can be finely varied, thereby increasing a cleansing effect and a massaging effect which are brought about by minute air bubbles.

(4) Pressure distribution P in which a low-pressure zone and a high-pressure zone are alternately annularly continuously formed can be formed on skin H with the stream Q of an air/liquid mixed fluid via the flow-out portion 7, whereby the skin H is stimulated to improve blood circulation thereof, and stains on the skin H can be effectively removed.

Embodiment 7

A description is given of a suction-cleansing device according to Embodiment 7 of the invention with reference to the drawings.

Figure 13:
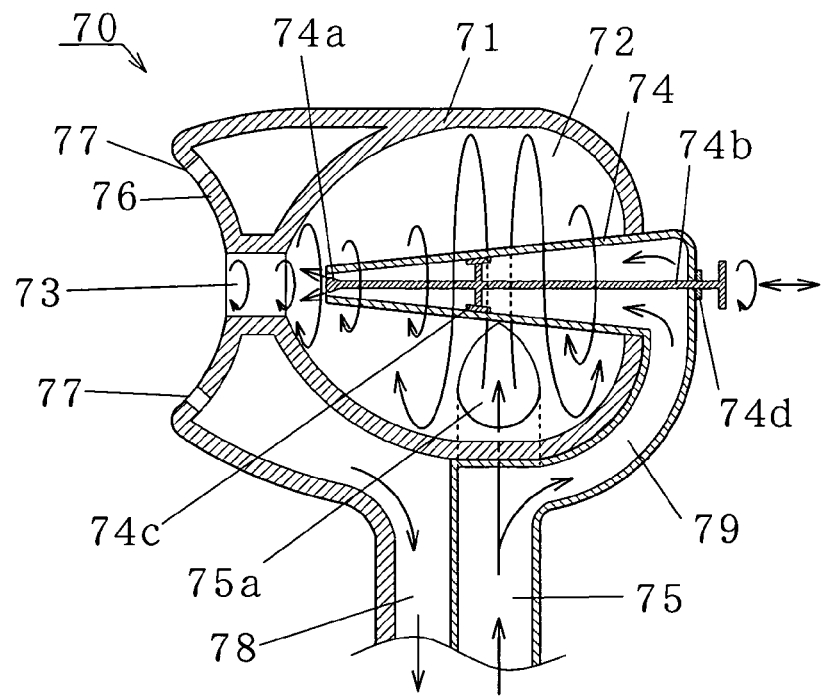
FIG. 13 is a sectional view showing a suction-cleansing device according to Embodiment 7 of the invention.

FIG. 13 is a sectional view of the suction-cleansing device according to Embodiment 7.

In FIG. 13, reference number 70 denotes a suction-cleansing device according to Embodiment 7. 71 denotes a vessel body which has a roughly oval-shaped hollow portion 72 converging from its rear part side to its front part side, the rear part side of which is curved. 73 denotes air/liquid jetting port which is formed at the front end portion of the vessel body 71. 74 denotes a water stream jetting nozzle portion which is inserted into the rear wall of the vessel body 71 and has its tip portion narrowed. 74a denotes an inverted conically-shaped water stream regulating member which is disposed at the tip portion of the water stream jetting nozzle portion 74 so as to freely advance and retreat. 74b denotes a rod-shaped supporting member which has the water stream regulating member 74a disposed at the tip portion thereof. 74c denotes an intermediate supporting member which supports the supporting member 74b at the intermediate part of the nozzle and is provided with a water-flow path. 74d denotes a position regulating and fixing portion, in which the supporting member 74b is screwed at the base end side in a state sealed by means of an O-ring, etc., and is supported to freely advance and retreat. 75 denotes a liquid-introducing pipe which has an introducing port 75a in the tangential direction along the circumferential wall of the vessel body 71 and is connected to the vessel body 71. 76 denotes an air/liquid jet-guiding portion which is disposed at the circumferential portion of the air/liquid jetting port 73 and formed so as to be semi-spherically widened to open. 77 denotes flow-out portions for a cleansing liquid, etc., which are plurally opened and formed on the air/liquid jet-guiding portion 76. 78 denotes a water stream collecting portion which communicates with the flow-out portion 77 and has a water-flow path for collecting the cleansing liquid. 79 denotes a water supply pipe which is bifurcated and formed at the wall side of the vessel body 71 of the liquid-introducing pipe 75 and supplies tap water or warm water into the water stream jetting nozzle portion 74.

A description is given of the use method of the suction-cleansing device 70 constructed as described above.

First, warm water whose temperature is 30 to 60° C. is supplied through the liquid-introducing pipe 75, wherein the warm water is distributed into a stream toward the water supply pipe 79 and a stream toward the introducing port 75a by the bifurcation portion of the liquid-introducing pipe 75, forms a swirling stream in the vessel body 71, and simultaneously a part thereof is supplied into the water stream jetting nozzle portion 74.

The water stream regulating member is disposed in the vicinity of the tip end of the water stream jetting nozzle portion 74, by adjusting the spacing therebetween to control the state of a mixed water stream that is formed by mixing a swirling stream which flows along the vessel body wall and a nozzle jetting stream, the negative-pressure portion can be effectively generated.

Thus, a great amount of dissolved air is discharged by reducing the pressure of warm water in which air is supersaturated, and a stream of water containing minute air bubbles can be jetted from the air/liquid jetting port 73.

Also, by adhering the air/liquid jet-guiding portion 76 to skin, concentric pressure distribution in which a high-pressure zone and a low-pressure zone are brought about alternately can be formed on the skin, wherein the skin is stimulated and activated, and a massaging effect and a cleansing effect can be further increased.

Since the suction-cleansing device 70 according to Embodiment 7 is constructed as described above, the following actions are brought about.

(1) Since a portion of tap water and warm water, which is supplied through the liquid-introducing pipe 75, can be directly jetted, in a high-pressure state, to the vicinity of the inside of the air/liquid jetting port 73 via the water stream jetting nozzle portion 74, the cleansing and massaging properties are excellent.

(2) Since the water stream collecting portion 78 is provided, cleansing water is not splashed to a large extent, wherein it is possible to prevent the surroundings from being stained.

(3) Since the air/liquid jet-guiding portion 76 is made to contact with skin and an enclosed system, in which water flows when jetting warm water, is formed, concentric low-pressure zones and high-pressure zones are alternately formed on skin by a jetting stream, wherein the skin is stimulated and activated.

(4) Since the water stream regulating member 74a is provided inside the tip end of the water stream jetting nozzle portion 74, the member 74 is caused to advance or retreat or is fixed at a prescribed position, wherein it is possible to adequately maintain the jetting angle of a stream of water and an air/liquid dispersed state.

(5) Where heated warm water is used as water supplied into the water stream jetting nozzle portion 74, the dissolution amount of air that can be dissolved in water is reduced to cause a supersaturated state, and the stream of water is made into a low-pressure state in the vessel body, wherein a great amount of dissolved air is discharged to increase the massaging effect.

(6) A nozzle jetting stream jetted to the front from the tip end of the water stream jetting nozzle portion 74 and a swirling stream on the vessel body wall, which flows from the introducing port 75a along the vessel body wall, are combined at the nozzle port, and minute air bubbles in the liquid are further finely dispersed, wherein a cleansing liquid and a massaging liquid can be obtained, the stream of which is mild and soft-fitted to the skin.

Embodiment 8

A description is given of a suction-cleansing device according to Embodiment 8 of the invention with reference to the drawings.

Figure 14:
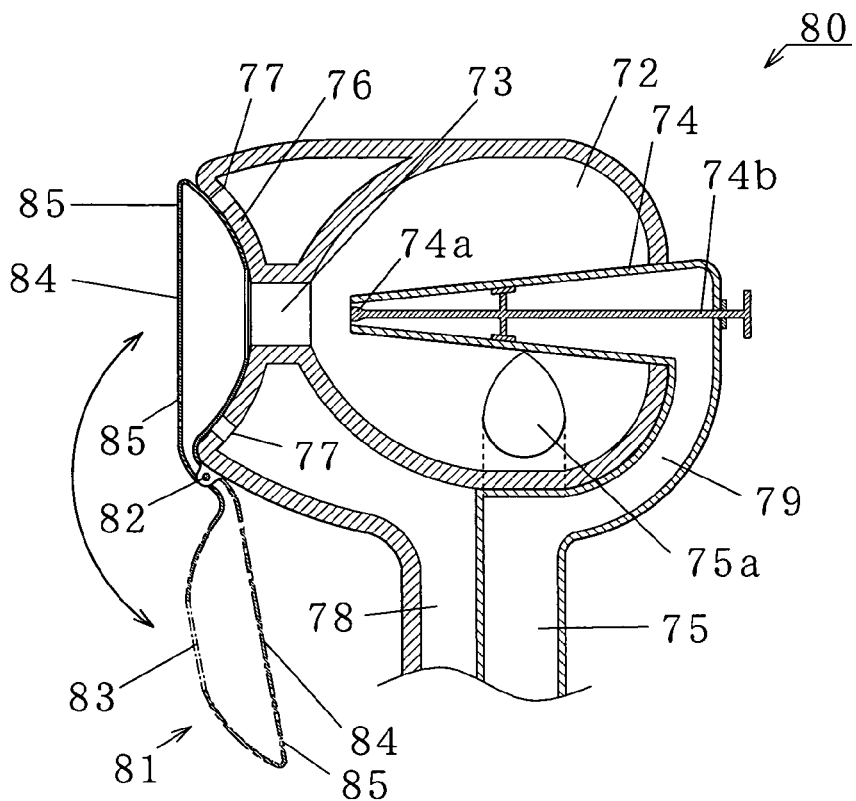
FIG. 14 is a sectional view showing a suction-cleansing device according to Embodiment 8 of the invention.

FIG. 14 is a sectional view of the suction-cleansing device according to Embodiment 8.

In FIG. 14, reference number 80 denotes a suction-cleansing device according to Embodiment 8. 81 denotes a semi-spherical flow-out regulating portion which is attached to the front surface side of the air/liquid jet-guiding portion 76. 82 denotes a hinge which is provided at the circumferential edge portion of the air/liquid jet-guiding portion 76 and rotatably supports the flow-out regulating portion 81. 83 denotes an opening portion which is made open at the middle of the semi-spherical flow-out regulating portion 81 and is formed so as to be roughly engaged in the air/liquid jetting port 73 when mounting the air/liquid jet-guiding portion 76. 84 denotes a disk portion (air axis fitting plate) which is formed roughly disk-shaped so that the middle at the front surface side of the flow-out regulating portion 81 is closed, and is disposed at the tip end position of the air axis in the vessel body. 85 denotes a number of pores 85 spraying mist-like warm water to the front surface side.

Also, the suction-cleansing device 80 according to Embodiment 8 is such that a flow-out regulating portion 81 is provided at the front surface side of the suction-cleansing device 70 according to Embodiment 7, wherein since the main components are the same as those of Embodiment 7, the components are given the same reference numbers, and description thereof is omitted.

A description is given of the use method of the flow-out regulating portion 81 in the suction-cleansing device 80.

First, warm water is supplied from the liquid-introducing pipe 75 in a state where the flow-out regulating portion 81 is attached to the air/liquid jet-guiding portion 76, and warm water is jetted from the air/liquid jetting port 73 in the form of water drops. At this time, the opening portion of the flow-out portion 77 is shielded by the flow-out regulating portion 81, and jetted warm water is sprayed like mist via pores 85 secured at the front surface of the flow-out regulating portion 81. That is, the suction-cleansing device is used as a general shower.

Furthermore, when the suction-cleansing device 80 is used as a shower, an air axis can be effectively formed before the air axis fitting plate 84 which is a low-pressure state (a negative pressure state). It is possible to prevent air from being mixed from outside by the air axis fitting plate 84, wherein a shower including further minute air bubbles is brought about.

In addition, in a state where the flow-out regulating portion 81 is turned at the hinge 82 and is removed from the air/liquid jet-guiding portion 76, the suction-cleansing device can be used as a cleansing device and a massaging device as in Embodiment 7 described above.

Since the suction-cleansing device 80 according to Embodiment 8 is constructed as described above, the following actions can be brought about in addition to those of the suction-cleansing device 70 according to Embodiment 7.

(1) Since the flow-out regulating portion 81 is rotatably provided at the circumferential edge portion of the air/liquid jet-guiding portion 76 via the hinge 82, in response to use conditions in a bathroom or washroom, the flow-out regulating portion 81 is fitted to the air/liquid jet-guiding portion 76, and the suction-cleansing device is used as a shower, and it may be used as a cleansing device or a massaging device with the flow-out regulating portion opened.

(2) Since the suction-cleansing device can be compactly accommodated in a state where the flow-out regulating portion 81 is fitted to the air/liquid jet-guiding portion 76, compact accommodation can be secured.

What is claimed is;

1. A suction-cleansing device comprising:
   a vessel body whose profile has a shape that is at least one of cannonball-like, circular-truncated, half-spherical, and shaped so as to have a swelled part at the vessel body's rear, said vessel body having a hollow portion whose profile converges from the hollow portion's rear side to the hollow portion's front side;
   an air/liquid jetting port located at a front end portion of the vessel body;
   a liquid-introducing pipe connected tangentially to a circumferential wall of the vessel body's rear;
   an air/liquid jet-guiding portion which is located circumferentially outward from the air/liquid jetting port, and which extends circumferentially outward from the air/liquid jetting port in a water jetting direction, the air/liquid jet guiding portion being formed to have at least one of a circular-truncated shape, a half-spherical shape, and a disk shape; and
   a flow-out portion composed of at least one of: notches formed in a front end portion of the air/liquid jet guiding portion and ports formed in the front end portion of the air/liquid jet guiding portion,
   wherein water flows out of flow-out portion through the at least one of notches and ports.

2. The suction-cleansing device as set forth in claim 1, including an air self-suction port that is opened and formed on a rear wall of said vessel body and at a position deviated from at least one of: an axial center of said vessel body and an air axis formed in said vessel body,
   wherein said rear wall is disposed opposite the air/liquid jetting port.

3. The suction-cleansing device as set forth in claim 2, including a rotating member that is attached by at least one of being screwed in a threaded portion and being fitted to a fitting portion, wherein the threaded portion and the fitting portion are each opened and formed in the rear wall of said vessel body and said rotating member is rotatably provided in a covered manner on the rear wall, centered around the position deviated from the axial center of said vessel body or the air axis formed in said vessel body, wherein said air self-suction port is formed on said rotating member and formed at a position deviated from the rotating axis of said rotating member.

4. The suction-cleansing device as set forth in claim 3, including a tank portion, which covers the rear wall of said vessel body or said rotating member, and which supplies air via the air self-suction port, and
   an air introducing port attached to said tank portion.

5. The suction-cleansing device as set forth in claim 1, including a water stream jetting nozzle portion whose tip end side is projected so as to be narrowed in its diameter from the rear part wall side of said vessel body and tip end opening portion is disposed inside said air/liquid jetting port, a plug-shaped, conically-shaped or inverted conically-shaped water stream regulating member disposed in the vicinity of the tip end of the nozzle via a rod-like supporting member inserted into said water stream jetting nozzle portion; and a position regulating and fixing portion, provided at the rear part wall side of said vessel body, which supports the base end side of said supporting member so as to advance and retreat or to be fixed.

6. The suction-cleansing device as set forth in any one of claims 1 through 5, including an inclined portion whose diameter is increased at a prescribed angle toward the jetting side on the inner circumferential wall of said air/liquid jetting port, and a flattened portion formed in contact with the front of said inclined portion.

7. The suction-cleansing device as set forth in any one of claims 1 through 6, including a flow-out portion provided by cutting off the front side edge portion of said air/liquid jet-guiding portion or opened to the front part side of said air/liquid jet-guiding portion.

8. The suction-cleansing device as set forth in any one of claims 1 through 7, including a splash-preventing portion circumferentially provided toward the rear of the front side edge portion of said air/liquid jet-guiding portion.

9. The suction-cleansing device as set forth in claim 7, including a water stream collecting portion for collecting streams of water discharged from the flow-out portion of said air/liquid jet-guiding portion.

10. The suction-cleansing device as set forth in claim 9, including a flow-out regulating portion whose base end is rotatably disposed by means of a hinge on the circumferential edge portion of said air/liquid jet-guiding portion and whose roughly half-spherical circumferential edge portion shields the flow-out portion of said air/liquid jet-guiding portion.

11. A cleansing apparatus comprising a suction-cleansing device as set forth in any one of claims 1 through 10, and a pump for supplying a cleansing liquid into said liquid-introducing pipe of said suction-cleansing device.

12. The cleansing apparatus as set forth in claim 11, wherein a pump air self-suction port for suctioning air is provided in a suction pipe for supplying a cleansing liquid, which is attached to the suction side of said pump.

13. The suction-cleansing device as set forth in claim 1, wherein the water flowing out of the notches or the flow-out portion creates suction in the air/liquid jetting port.

14. The suction-cleansing device as set forth in claim 2, including a tank portion which covers the rear wall of the vessel body, which supplies air via the air self-suction port, and an air introducing port attached to said tank portion.

15. A suction-cleansing device comprising:

a vessel body having a hollow portion whose profile converges from the hollow portion's rear side to the hollow portion's front side;

an air/liquid jetting port located at a front end portion of the vessel body;

a liquid-introducing pipe connected tangentially to a circumferential wall of the vessel body's rear side an air/liquid jet-guiding portion which is located circumferentially outward from the air/liquid jetting port and which extends circumferentially outward from the air/liquid jetting port in a water jetting direction;

a flow-out portion composed of at least one of: notches formed in a front end portion of the air/liquid jet guiding portion and ports formed in the front end portion of the air/liquid jet guiding portion, wherein water flows out of the flow-out portion through the at least one of notches and ports;

an air self-suction port that is opened and formed on a rear wall of the vessel body and at a position deviated from an axial center of said vessel body or from an air axis formed in said vessel body; and a tank portion, which covers the rear wall of said vessel body, and which supplies air via the air self-suction port, and an air introducing port attached to said tank portion.

16. A suction-cleansing device comprising:

a vessel body having a hollow portion whose profile converges from the hollow portion's rear side to the hollow portion's front side;

an air/liquid jetting port located at a front end portion of the vessel body;

a liquid-introducing pipe connected tangentially to a circumferential wall of the vessel body's rear side;

an air/liquid jet-guiding portion which is located circumferentially outward from the air/liquid jetting port and which extends circumferentially outward from the air/liquid jetting port in a water jetting direction;

a flow-out portion composed of at least one of: notches formed in a front end portion of the air/liquid jet guiding portion and ports formed in the front end portion of the air/liquid jet guiding portion;

wherein water flows out of the flow-out portion through the at least one of notches and ports;

an air self-suction port that is opened and formed on a rear wall of the vessel body and at a position deviated from an axial center of said vessel body or from an air axis formed in said vessel body;

a rotating member that is attached by at least one of being screwed in a threaded portion and being fitted to a fitting portion, wherein the threaded portion and the fitting position are each opened and formed in the rear wall of said vessel body and said rotating member is rotatably provided in a covered manner on the rear wall, centered around the position deviated from the axial center of said vessel body or the air axis formed in said vessel body, wherein said air self-suction port is formed on said rotating member and formed at a position deviated from a rotating axis of said rotating member; and a tank portion, which covers the rear wall of said vessel body or said rotating member, and which supplies air via the air self-suction port, and an air introducing port attached to said tank portion.

* * * * *